(12) United States Patent
Shinohara et al.

(10) Patent No.: US 7,683,939 B2
(45) Date of Patent: Mar. 23, 2010

(54) METHOD OF AND UNIT FOR INPUTTING AN IMAGE, AND COMPUTER PRODUCT

(75) Inventors: Junichi Shinohara, Kanagawa (JP); Shigeru Irisawa, Kanagawa (JP); Masami Nasu, Kanagawa (JP); Atsushi Satoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 280 days.

(21) Appl. No.: 11/850,201

(22) Filed: Sep. 5, 2007

(65) Prior Publication Data

US 2008/0043287 A1 Feb. 21, 2008

Related U.S. Application Data

(62) Division of application No. 09/986,880, filed on Nov. 13, 2001, now Pat. No. 7,286,164.

(30) Foreign Application Priority Data

Jan. 19, 2001 (JP) .............................. 2001-012498

(51) Int. Cl.
*H04N 5/225* (2006.01)
*H04N 5/228* (2006.01)

(52) U.S. Cl. ............... 348/219.1; 348/218.1; 348/208.7

(58) Field of Classification Search .............. 348/219.1, 348/218.1, 208.7, 208.11, 208.13
See application file for complete search history.

(56) References Cited

U.S. PATENT DOCUMENTS

| 4,607,287 | A | * | 8/1986 | Endo et al. ............... 348/219.1 |
| 4,634,884 | A | * | 1/1987 | Hayashimoto et al. ... 250/208.1 |
| 5,561,460 | A | * | 10/1996 | Katoh et al. ............. 348/219.1 |
| 5,731,849 | A | | 3/1998 | Kondo et al. |
| 5,969,757 | A | | 10/1999 | Okada et al. |
| 6,122,004 | A | * | 9/2000 | Hwang ................... 348/208.13 |
| 6,195,125 | B1 | * | 2/2001 | Udagawa et al. ......... 348/222.1 |
| 6,266,086 | B1 | | 7/2001 | Okada et al. |
| 6,687,386 | B1 | | 2/2004 | Ito et al. |
| 6,734,903 | B1 | | 5/2004 | Takeda et al. |
| 6,801,248 | B1 | | 10/2004 | Horiuchi |
| 2002/0097324 | A1 | | 7/2002 | Onuki |

FOREIGN PATENT DOCUMENTS

| JP | 9-135381 | 5/1997 |
| JP | 10-56595 | 2/1998 |
| JP | 10056595 A | 2/1998 |
| JP | 11-187309 | 7/1999 |

* cited by examiner

*Primary Examiner*—Luong T Nguyen
(74) *Attorney, Agent, or Firm*—Oblon, Spivak, McClelland, Maier & Neustadt, L.L.P.

(57) ABSTRACT

The image input unit comprises a pixel shift evaluation value and reliability calculating section that calculates a pixel shift evaluation value based on image data for a plurality of images photographed before and after an image sensing device is displaced for a predetermined amount. Moreover, a system controller judges whether pixel shift photography has been normally performed or not based on the pixel shift evaluation value, and displays the judgment result on a display.

22 Claims, 23 Drawing Sheets

FIG.5A  PHOTOGRAPHED IMAGE 1
(NO SHIFT)
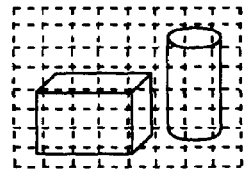
FIG.5B  PHOTOGRAPHED IMAGE 2
(AFTER SHIFT)
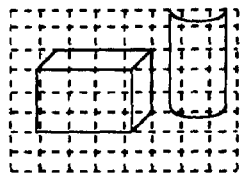
FIG.5C  TARGET IMAGE
(SHIFT PHOTOGRAPHED
IMAGE 1 TO ↑1→0)
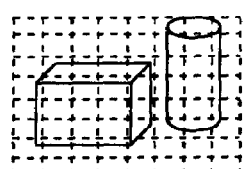
FIG.6A  PHOTOGRAPHED
IMAGE 1
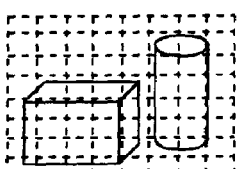
FIG.6B  PHOTOGRAPHED
IMAGE 2
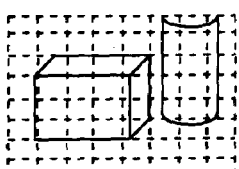

FIG.7A   SHIFT PHOTOGRAPHED IMAGE 2 TO ↑0 →1, CORRELATION
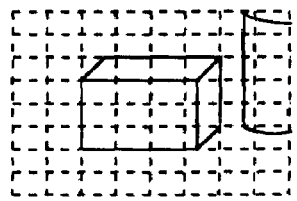
COEFFICIENT (WITH RESPECT TO IMAGE 1) 0.45
FIG.7B   SHIFT PHOTOGRAPHED IMAGE 2 TO ↓1 →1, CORRELATION
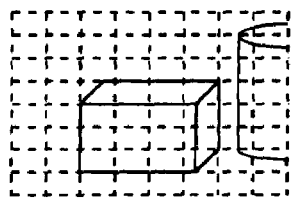
COEFFICIENT (WITH RESPECT TO IMAGE 1) 0.7
FIG.7C   SHIFT PHOTOGRAPHED IMAGE 2 TO ↓2 →1, CORRELATION
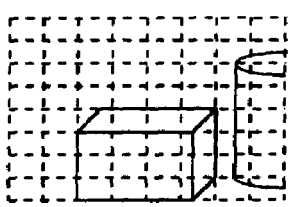
COEFFICIENT (WITH RESPECT TO IMAGE 1) 0.65
FIG.7D   SHIFT PHOTOGRAPHED IMAGE 2 TO ↓3 →1, CORRELATION
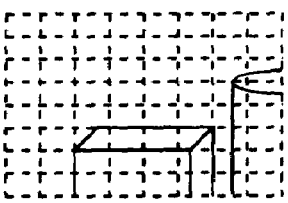
COEFFICIENT (WITH RESPECT TO IMAGE 1) 0.4

FIG.8A  SHIFT PHOTOGRAPHED IMAGE 2 TO ↑ 0 →0, CORRELATION
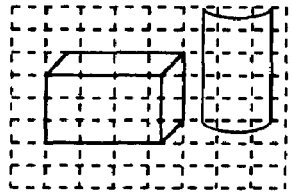
COEFFICIENT (WITH RESPECT TO IMAGE 1) 0.7
FIG.8B  SHIFT PHOTOGRAPHED IMAGE 2 TO ↓ 1 →0, CORRELATION
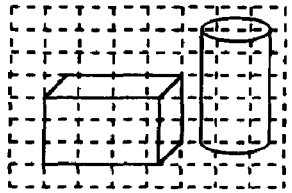
COEFFICIENT (WITH RESPECT TO IMAGE 1) 0.95
FIG.8C  SHIFT PHOTOGRAPHED IMAGE 2 TO ↓ 2 →0, CORRELATION
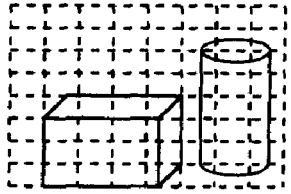
COEFFICIENT (WITH RESPECT TO IMAGE 1) 0.9
FIG.8D  SHIFT PHOTOGRAPHED IMAGE 2 TO ↓ 3 →0, CORRELATION
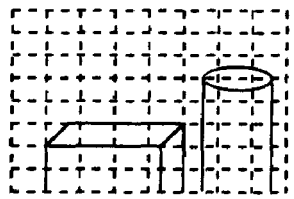
COEFFICIENT (WITH RESPECT TO IMAGE 1) 0.65

FIG.9A  SHIFT PHOTOGRAPHED IMAGE
2 TO ↑ 0 ←1, CORRELATION
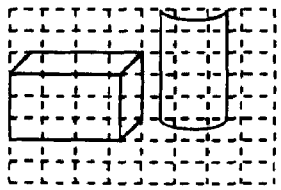
COEFFICIENT (WITH RESPECT TO IMAGE 1) 0.6
FIG.9B  SHIFT PHOTOGRAPHED IMAGE
2 TO ↑ 1 ←1, CORRELATION
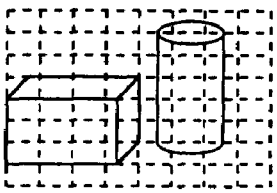
COEFFICIENT (WITH RESPECT TO IMAGE 1) 0.85
FIG.9C  SHIFT PHOTOGRAPHED IMAGE
2 TO ↓ 2 ←1, CORRELATION
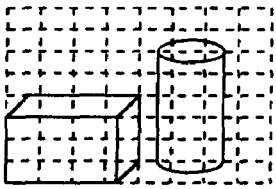
COEFFICIENT (WITH RESPECT TO IMAGE 1) 0.8
FIG.9D  SHIFT PHOTOGRAPHED IMAGE
2 TO ↓ 3 ←1, CORRELATION
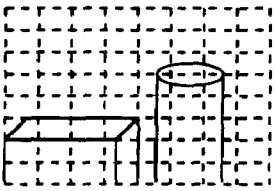
COEFFICIENT (WITH RESPECT TO IMAGE 1) 0.55

FIG.10A  SHIFT PHOTOGRAPHED IMAGE 2 TO ↑0 ←2, CORRELATION
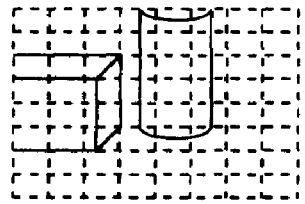
COEFFICIENT (WITH RESPECT TO IMAGE 1) 0.3
FIG.10B  SHIFT PHOTOGRAPHED IMAGE 2 TO ↑1 ←2, CORRELATION
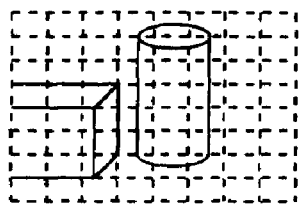
COEFFICIENT (WITH RESPECT TO IMAGE 1) 0.6
FIG.10C  SHIFT PHOTOGRAPHED IMAGE 2 TO ↑2 ←2, CORRELATION
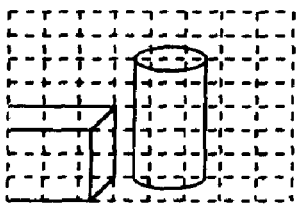
COEFFICIENT (WITH RESPECT TO IMAGE 1) 0.55
FIG.10D  SHIFT PHOTOGRAPHED IMAGE 2 TO ↑3 ←2, CORRELATION
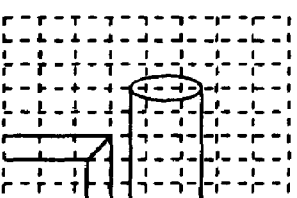
COEFFICIENT (WITH RESPECT TO IMAGE 1) 0.25

AMOUNT OF SHIFT IN EACH POSITION (EXAMPLE)

PIXEL SHIFT (NORMAL STATE)

——— : BEFORE PIXEL SHIFT
-------- : AFTER PIXEL SHIFT

AMOUNT OF SHIFT IN EACH POSITION (EXAMPLE)

| LEFT UPPER AREA | UPPER AREA | RIGHT UPPER AREA |
|---|---|---|
| 1.01 / 0.01 | 1.03 / 0.03 | 1.01 / 0.02 |
| LEFT AREA | CENTRAL AREA | RIGHT AREA |
| 1.18 / 0.01 | 1.02 / 0.00 | 1.01 / 0.02 |
| LEFT LOWER AREA | LOWER AREA | RIGHT LOWER AREA |
| 1.00 / 0.01 | 1.01 / 0.01 | 1.06 / 0.05 |

PIXEL SHIFT (WHEN THERE IS A HAND MOVEMENT OR WHEN THERE IS A FAILURE IN THE MECHANISM)

——— : BEFORE PIXEL SHIFT
------- : AFTER PIXEL SHIFT

AMOUNT OF SHIFT IN EACH POSITION (EXAMPLE)

| LEFT UPPER AREA | UPPER AREA | RIGHT UPPER AREA |
|---|---|---|
| 1.19 ↑ → 0.62 | 1.25 ↑ → 0.58 | 1.23 ↑ → 0.50 |
| LEFT AREA | CENTRAL AREA | RIGHT AREA |
| 1.18 ↑ → 0.63 | 1.20 ↑ → 0.59 | 1.23 ↑ → 0.59 |
| LEFT LOWER AREA | LOWER AREA | RIGHT LOWER AREA |
| 1.19 ↑ → 0.59 | 1.19 ↑ → 0.54 | 1.20 ↑ → 0.62 |

PIXEL SHIFT (WHEN THERE IS A HAND MOVEMENT OR WHEN THERE IS A FAILURE IN THE MECHANISM)

——— : BEFORE PIXEL SHIFT
------ : AFTER PIXEL SHIFT

AMOUNT OF SHIFT IN EACH POSITION (EXAMPLE)

| LEFT UPPER AREA | UPPER AREA | RIGHT UPPER AREA |
|---|---|---|
| 0.28<br>0.78 | 1.08<br>0.03 | 1.25<br>0.12 |
| LEFT AREA | CENTRAL AREA | RIGHT AREA |
| 0.12<br>0.15 | 1.02<br>0.02 | 1.32<br>0.20 |
| LEFT LOWER AREA | LOWER AREA | RIGHT LOWER AREA |
| 0.53<br>0.04 | 1.01<br>0.12 | 1.27<br>0.18 |

PIXEL SHIFT (MOVING OBJECT EXIST)

——— : BEFORE PIXEL SHIFT
-------- : AFTER PIXEL SHIFT

AMOUNT OF SHIFT IN EACH POSITION (EXAMPLE)

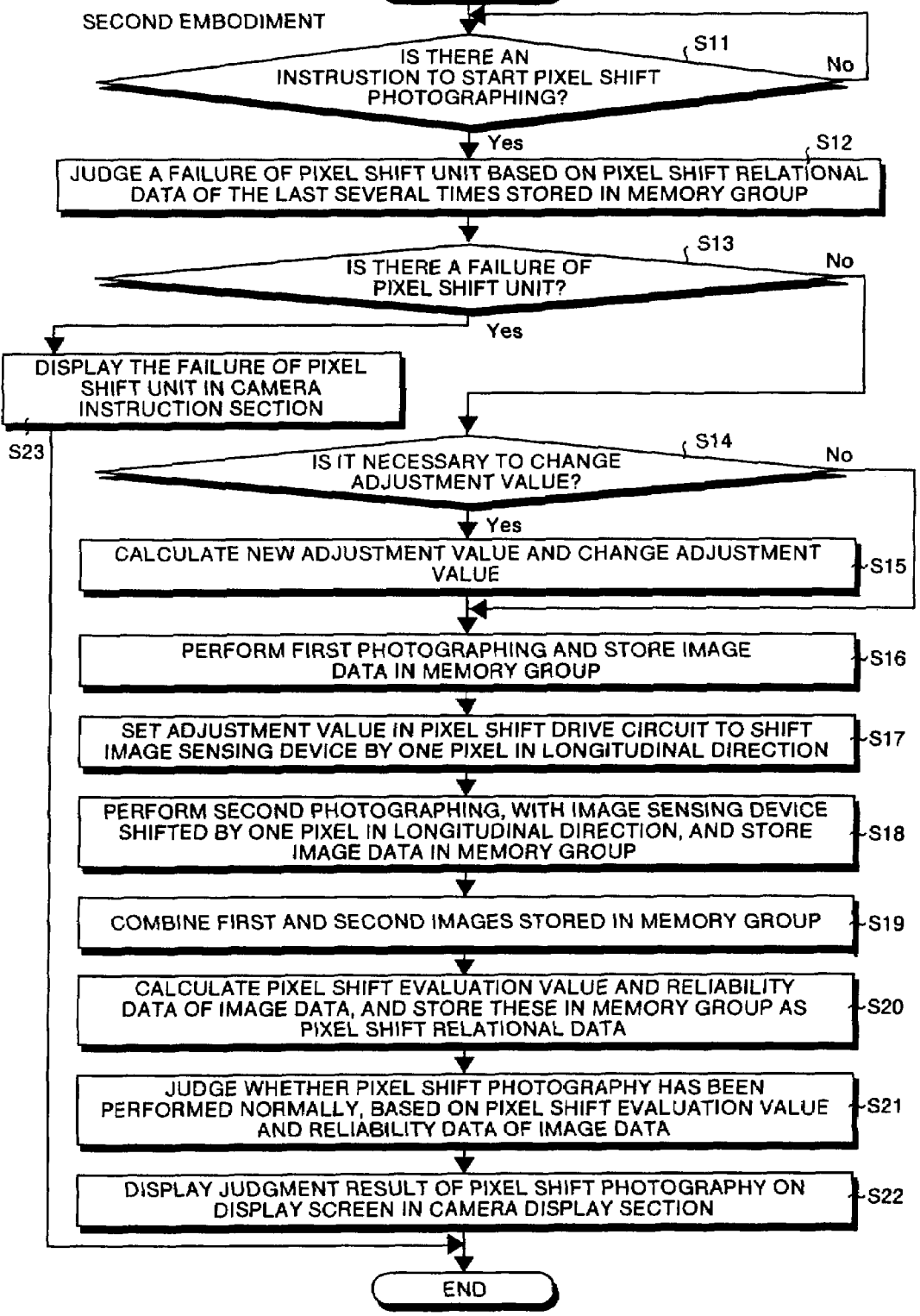

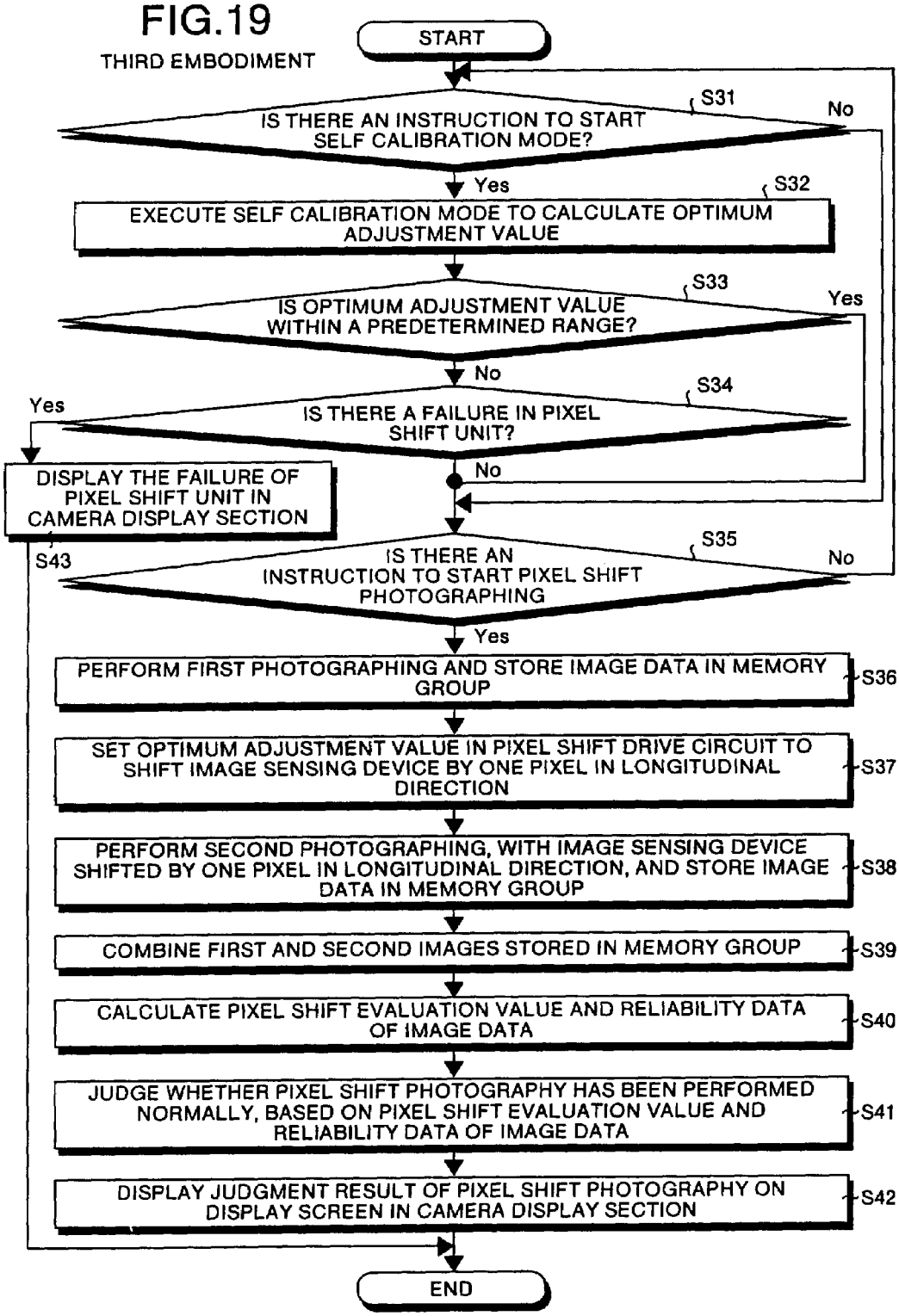

PHOTOGRAPHED IMAGE 1
(NO SHIFT)

TARGET IMAGE
(IMAGE 1 ↓1 →0)

FIG.21A
PHOTOGRAPHED IMAGE 2,
(ADJUSTMENT VALUE = 80)

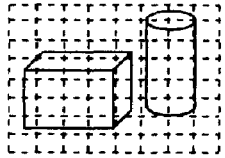

COINCIDENCE DEGREE WITH
RESPECT TO TARGET IMAGE = 0.75

FIG.21B
PHOTOGRAPHED IMAGE 3,
(ADJUSTMENT VALUE = 90)

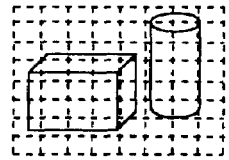

COINCIDENCE DEGREE WITH
RESPECT TO TARGET IMAGE = 0.85

FIG.21C
PHOTOGRAPHED IMAGE 4,
(ADJUSTMENT VALUE = 100)

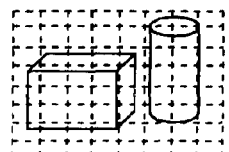

COINCIDENCE DEGREE WITH
RESPECT TO TARGET IMAGE = 0.95

FIG.21D
PHOTOGRAPHED IMAGE 5,
(ADJUSTMENT VALUE = 110)

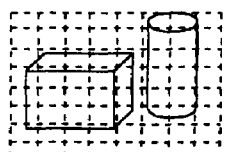

COINCIDENCE DEGREE WITH
RESPECT TO TARGET IMAGE = 0.93

FIG.21E
PHOTOGRAPHED IMAGE 6,
(ADJUSTMENT VALUE = 120)

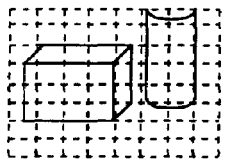

COINCIDENCE DEGREE WITH
RESPECT TO TARGET IMAGE = 0.83

FIG.21F
PHOTOGRAPHED IMAGE 7,
(ADJUSTMENT VALUE = 130)

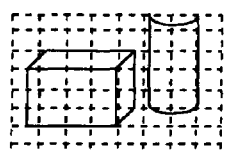

COINCIDENCE DEGREE WITH
RESPECT TO TARGET IMAGE = 0.73

FIG.21G
PHOTOGRAPHED IMAGE 8,
(ADJUSTMENT VALUE = 140)

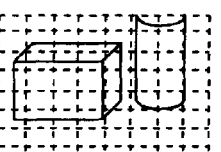

COINCIDENCE DEGREE WITH
RESPECT TO TARGET IMAGE = 0.63

FIG.21H
PHOTOGRAPHED IMAGE 9,
(ADJUSTMENT VALUE = 150)

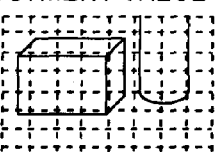

COINCIDENCE DEGREE WITH
RESPECT TO TARGET IMAGE = 0.53

FIG.24  (b) IN THE CASE OF ADJUSTMENT VALUE IS DEVIATED LARGELY
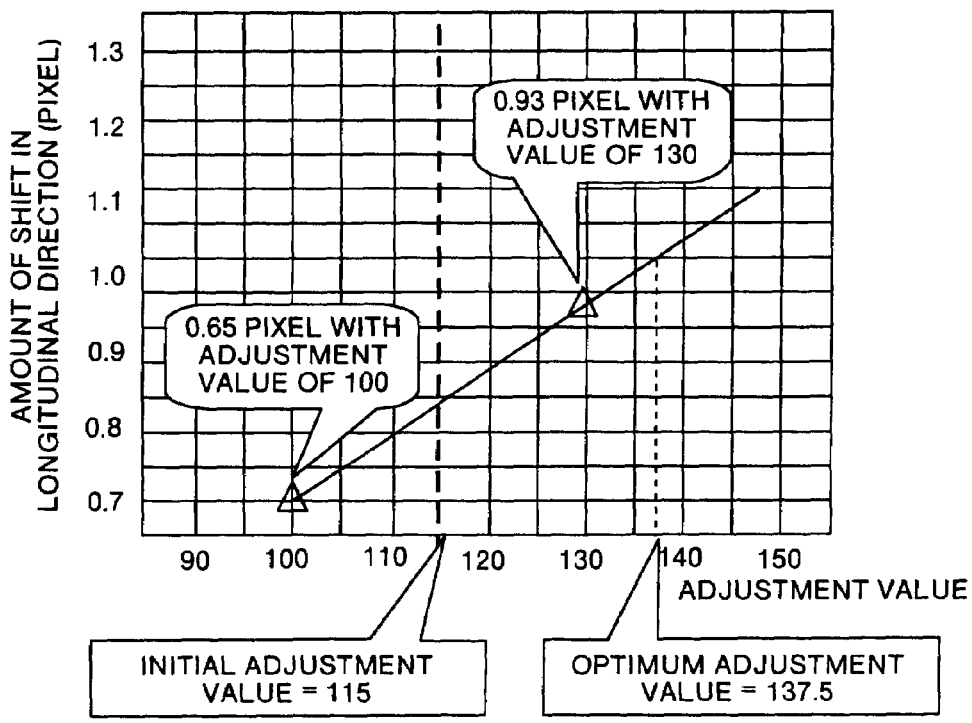
FIG.25  (2) IN THE CASE OF ADJUSTMENT VALUE AT ONE POINT
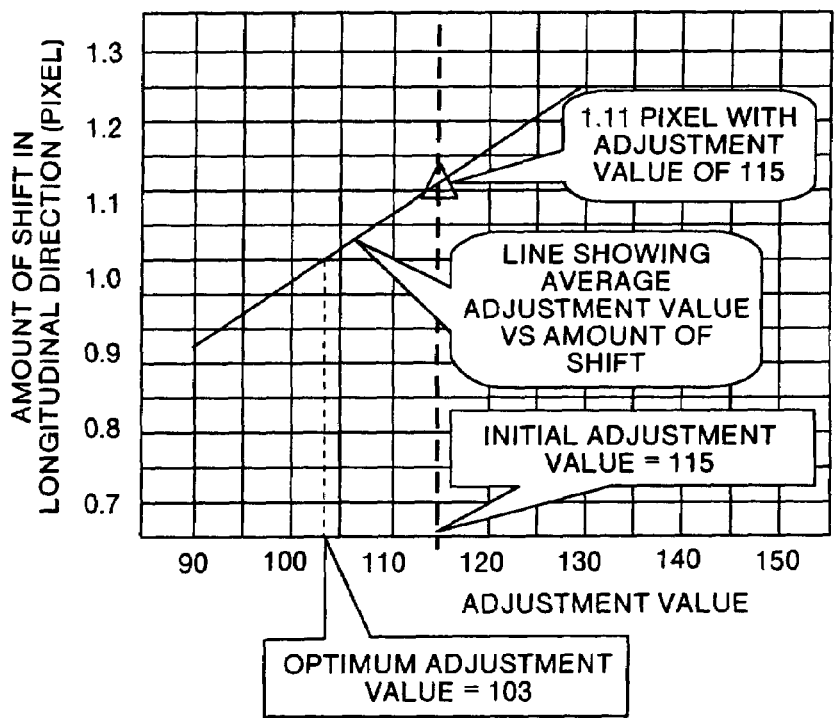

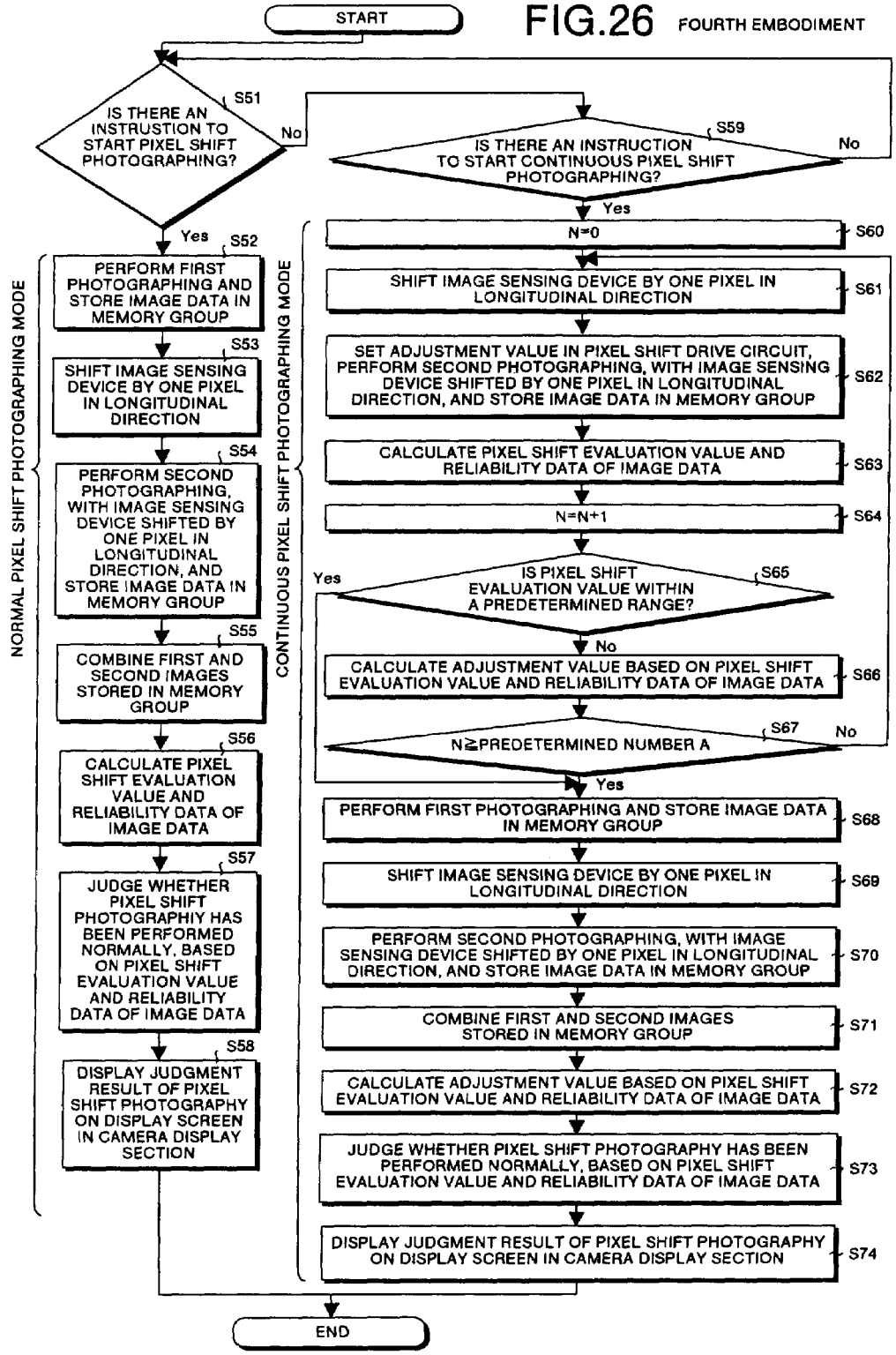

CCD SHIFT METHOD

LPF GRADIENT METHOD

LENS SHIFT METHOD

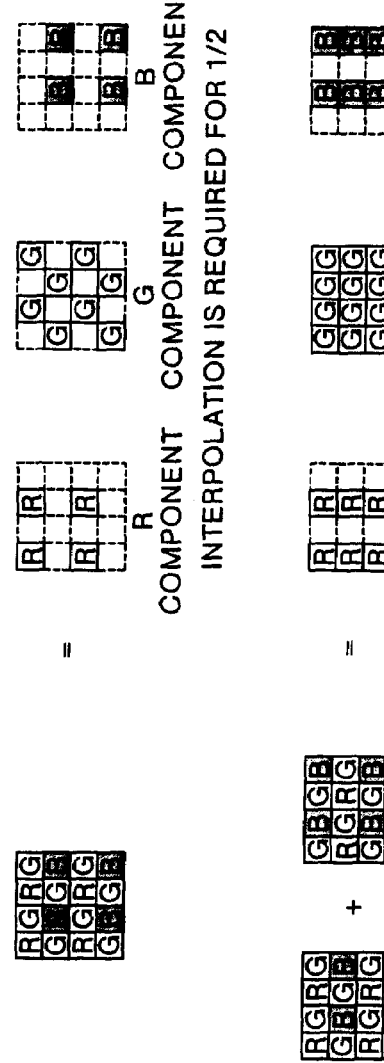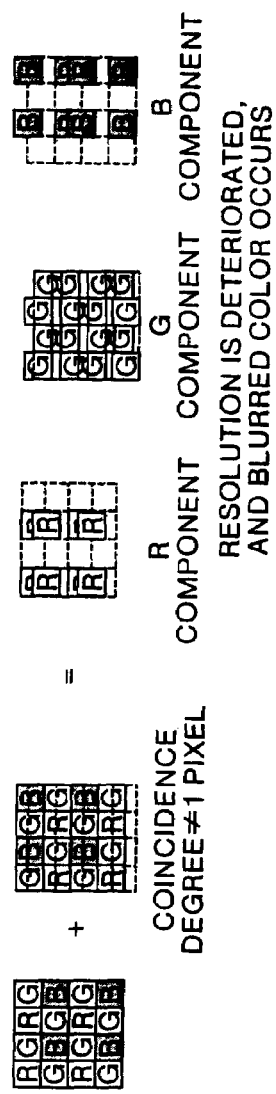
FIG.28A NORMAL PHOTOGRAPHING
PRIOR ART
FIG.28B PIXEL SHIFT PHOTOGRAPHING (IDEAL STATE)
FIG.28C PIXEL SHIFT PHOTOGRAPHING (AT THE TIME OF INSUFFICIENT ACCURACY)

METHOD OF AND UNIT FOR INPUTTING AN IMAGE, AND COMPUTER PRODUCT

CROSS-REFERENCE TO RELATED APPLICATIONS

This application is a divisional Application of, and claims the benefit of priority under 35 U.S.C. §120 from, U.S. application Ser. No. 09/986,880, filed Nov. 13, 2001, which claims the benefit of priority under 35 U.S.C. §119 from Japanese Patent Application No. 2001-012498 filed Jan. 19, 2001. The entire contents of each of the above applications are incorporated herein by reference.

FIELD OF THE INVENTION

The present invention relates to a unit for inputting an image ("image input unit") that can perform pixel shift photography to obtain a high quality image. Moreover, this invention relates to a method of inputting an image ("image input method"), and a computer-readable recording medium that stores a computer program for realizing the method.

BACKGROUND OF THE INVENTION

With the development of solid-state image sensing devices, image input equipment such as small video cameras for household use, digital cameras for personal computers, etc., have rapidly become widespread. In the case of the video camera, sufficient image quality can be obtained from a standpoint of television standard such as NTSC. CCD is normally used as the image sensing device. However, the CCD reads two fields twice as one frame corresponding to the NTSC and PAL methods, and the majority thereof has an oblong pixel.

However, recently, the object is to display images picked-up using a digital still camera on a display of a personal computer or the like. As a result, a CCD that reads all the square pixels (i.e. the progressive scan type) have been used as the image sensing device.

Thus, now a days the images picked-up with the digital still camera are mostly edited using a personal computer and printed using a printer. However, if a large-sized image is to be obtained, or a resolution that is necessary as a hard copy or computer graphics or the like is to be obtained, then the number of pixels provided in the present day digital still camera are not sufficient. A solid-state image sensing device having a higher number of pixels becomes necessary in these purposes. However, a screen size of the solid-state image sensing device becomes larger if the resolution is increased. As the screen size becomes larger, the lens section has to be made larger so that a down-sizing of the digital still camera becomes difficult. Moreover, a cost of such the solid-state image sensing device increases and can it not be used in the low-cost widespread digital cameras.

As a method of realizing high quality by the solid-state image sensing device, a so-called method of "pixel shift photography" has been well known. The pixel shift photography is a method of obtaining a high resolution by combining an image photographed by shifting a subject by half of a pixel pitch and an image before such shifting to obtain one image. Typical examples of the conventional image shift mechanism are shown in FIG. 27A to FIG. 27C. FIG. 27A shows a CCD shift method. In this CCD shift method, the image sensing device is shifted to obtain images that are different from each other. FIG. 27B shows a LPF gradient method. In this LPF gradient method, a LPF is inclined to obtain images that are different from each other. FIG. 27C shows a lens shift method. In this lens shift method, a lens is shifted to obtain images that are different from each other.

A desired image quality may not be obtained in the pixel shift photography because of the events such as a movement of hands, a movement of the subject, or a change in a performance of the pixel shift mechanism. In each of these events, the degree of deterioration of the image differs depending on the degree thereof. If the deterioration of the image crosses a certain level, the image may become inferior as compared to an image obtained in ordinary photography. The ordinary photography is the one that does not apply the technique of the pixel shift photography.

The cause of the change in the performance of the pixel shift mechanism may as follows. That is, an amount of shift of the pixel shift mechanism may change slightly due to a lapse of time, or the amount of shift of the pixel shift mechanism may change temporarily due to a change in the atmospheric temperature, or the pixel shift mechanism may fail due to vibration or impact and whereby the normal operation cannot be performed. The pixel shift mechanism requires micro-level displacement at high accuracy in comparison to any other mechanical sections of the digital camera. Therefore, the pixel shift mechanism is likely to be affected readily by the lapse of time, change in the temperature, and the influence of vibrations and impact. Thus, it is very likely that the pixel shift mechanism becomes defective permanently or temporarily.

For example, there is a case where a chemical reaction of curing progresses slightly even in a cured state of an adhesive, which would be judged as "being sufficiently cured" for normal use, and this slight difference will largely affect the pixel shift. Moreover, a slight change in rigidity of a structure due to temperature, a slight change in a coefficient of friction due to a change with the lapse of time, and a minute shift of a contact point of a structure due to an impact may cause a serious problem in the pixel shift, though these may be considered only as an error in a normal mechanism.

Moreover, if each of the movement of hands, the movement of the subject, or the change in the performance of the pixel shift mechanism is slight, although a higher quality can be obtained, the image quality is not near to the desired one. Deterioration of the quality of the images herein means a deterioration of resolution, an increase of blurred color, or the like.

FIG. 28A to FIG. 28C are diagrams for explaining the principle of pixel shift and image deterioration. A CCD having the Bayor array is taken as an example. As shown in FIG. 28A, in normal photographing, R, G and B signals of the CCD are interpolated to obtain R, G and B signals for each pixel. FIG. 28B shows an ideal state when the pixel shift photography (a shift by one pixel in the longitudinal direction) is performed. In the case of this pixel shift photography, an image having a high resolution can be obtained, and interpolation is not required. On the other hand, FIG. 28C shows a state when an accuracy of the pixel shift photography (a shift by one pixel in the longitudinal direction) is insufficient. In the case shown in FIG. 28C, the resolution of the image is deteriorated, and blurred color occurs.

A further problem is that a type of a LCD monitor normally mounted on a digital camera has a small number of displayed pixels. Therefore, even if there is a deterioration in the image quality, it can not be detected. In most cases, the deterioration in the image quality is recognized only after the image is transferred to a personal computer. Thus, failure of the pixel shift photography cannot be judged only with a digital camera (i.e., for example, the personal computer is required).

SUMMARY OF THE INVENTION

It is an object of the present invention to provide an image input unit that can prevent unsuccessful photographing in the pixel shift photography as much as possible, and with which a photographer can obtain a desired high quality image, even if movement of hands, movement of the subject, or a performance change of the pixel shift mechanism occurs. It is another object of this invention to provide an image input method and a computer-readable recording medium that stores a computer program for realizing the method according to the present invention.

The image input unit according to one aspect of this invention is capable of performing pixel shift photography. This image input unit comprises: a photographic optical system which forms an image of a subject in a predetermined position; an image sensing unit which generates image data corresponding to the image of the subject; a pixel shift mechanism which displaces the image sensing unit by a predetermined amount; a pixel shift mechanism control unit which controls the pixel shift mechanism so as to displace the image sensing unit by the predetermined amount; an image combining unit which generates image data for one image by combining the image data for a plurality of images output before and after the displacement of the image sensing unit; and a judgment unit which judges whether the pixel shift photography has been normally performed or not, based on the image data for a plurality of images output before and after the displacement of the image sensing unit.

According to the above invention, the photographic optical system forms an image of the subject in the predetermined position. The image sensing unit generates image data corresponding to the image of the subject. The pixel shift mechanism control unit controls the pixel shift mechanism to displace the image sensing unit by a predetermined amount. The image combining unit generates image data for one image by combining image data for the plurality of images output before and after the displacement of the image sensing unit. The judgment unit judges whether the pixel shift photography has been normally performed or not, based on the image data for a plurality of images output before and after the displacement of the image sensing unit.

The image input unit according to another aspect of this invention is capable of performing pixel shift photography. This image input unit comprises: a photographic optical system which forms an image of a subject in a predetermined position; an image sensing unit which generates image data corresponding to the image of the subject; a pixel shift mechanism which displaces the image sensing unit by a predetermined amount; a pixel shift mechanism control unit which controls the pixel shift mechanism so as to displace the image sensing unit by the predetermined amount; an image combining unit which generates image data for one image by combining the image data for a plurality of images output before and after the displacement of the image sensing unit; a pixel shift evaluation value calculation unit which calculates a pixel shift evaluation value for judging whether the pixel shift photography has been normally performed or not, based on the image data for a plurality of images output before and after the displacement of the image sensing unit; a storage unit which stores the pixel shift evaluation value calculated by the pixel shift evaluation value calculation unit; a storage control which controls storage of the pixel shift evaluation value in the storage unit; and a failure judgment unit which judges a failure of the pixel shift mechanism, based on the pixel shift evaluation values obtained by performing the pixel shift photography for several times and stored in the storage unit.

According to the above invention, the photographic optical system forms an image of a subject in a predetermined position, the image sensing unit generates image data corresponding to the image of the subject, the pixel shift mechanism control unit controls the pixel shift mechanism to displace the image sensing unit by a predetermined amount. The image combining unit generates image data for one image by combining image data for the plurality of images output before and after the displacement of the image sensing unit. The pixel shift evaluation value calculation unit calculates a pixel shift evaluation value for judging whether the pixel shift photography has been normally performed or not, based on the image data for a plurality of images output before and after the displacement of the image sensing unit. The storage control unit stores the pixel shift evaluation value calculated by the pixel shift evaluation value calculation unit in the storage unit, and the failure judgment unit judges a failure of the pixel shift mechanism, based on the pixel shift evaluation values obtained by performing the pixel shift photography for several times and stored in the storage unit.

The image input unit according to still another aspect of this invention is capable of performing pixel shift photography. This image input unit comprises: a photographic optical system which forms an image of a subject in a predetermined position; an image sensing unit which generates image data corresponding to the image of the subject; a pixel shift mechanism which displaces the image sensing unit by a predetermined amount; an adjustment value storage unit which stores an adjustment value for driving the pixel shift mechanism; a pixel shift mechanism control unit which controls the pixel shift mechanism based on the adjustment value stored in the adjustment value storage unit, to thereby displace the image sensing unit by a predetermined amount; an image combining unit which generates image data for one image by combining the image data for a plurality of images output before and after the displacement of the image sensing unit; a pixel shift evaluation value calculation unit which calculates a pixel shift evaluation value for judging whether the pixel shift photography has been normally performed or not, based on the image data for a plurality of images output before and after the displacement of the image sensing unit; a selection unit which selects the pixel shift calibration mode; and a self calibration unit which executes pre-pixel shift photography once or plural times, when the pixel shift calibration mode is selected, and re-calculates the adjustment value based on the pixel shift evaluation value for each pixel shift photography, calculated by the pixel shift evaluation value calculation unit, to thereby calculate a new adjustment value, and changes the adjustment value stored in the adjustment value storage unit to the new adjustment value.

According to the above invention, the photographic optical system forms an image of the subject in the predetermined position, the image sensing unit generates image data corresponding to the image of the subject, and the pixel shift mechanism control unit controls the pixel shift mechanism based on the adjustment value stored in the adjustment value storage unit to displace the image sensing unit by a predetermined amount. The image combining unit generates image data for one image by combining image data for the plurality of images output before and after the displacement of the image sensing unit. The pixel shift evaluation value calculation unit judges whether the pixel shift photography has been normally performed or not, based on the image data for a plurality of images output before and after the displacement of the image sensing unit. The selection unit selects the pixel shift calibration mode. When the pixel shift calibration mode is selected, the self calibration unit executes pre-pixel shift photography once or plural times, re-calculates the adjustment value based on the pixel shift evaluation value for each pixel shift photography, calculated by the pixel shift evaluation value calculation unit, to thereby calculate a new adjustment value, and changes the adjustment value stored in the adjustment value storage unit to the new adjustment value.

The image input unit according to still another aspect of this invention is capable of performing pixel shift photography. This image input unit comprises: a photographic optical system which forms an image of a subject in a predetermined position; an image sensing unit which generates image data corresponding to the image of the subject; a pixel shift mechanism which displaces the image sensing unit by a predetermined amount; an adjustment value storage unit which stores an adjustment value for driving the pixel shift mechanism; a pixel shift mechanism control unit which controls the pixel shift mechanism based on the adjustment value stored in the adjustment value storage unit, to thereby displace the image sensing unit by a predetermined amount; an image combining unit which generates image data for one image by combining the image data for a plurality of images output before and after the displacement of the image sensing unit; a pixel shift evaluation value calculation unit which calculates a pixel shift evaluation value for judging whether the pixel shift photography has been normally performed or not, based on the image data for a plurality of images output before and after the displacement of the image sensing unit; and a pixel shift photography control unit which controls to execute an operation repetitively in which, when a continuous pixel shift mode is selected, a pre-pixel shift photography is executed by setting an adjustment value in the pixel shift mechanism, the pixel shift evaluation value calculation unit calculates the pixel shift evaluation value to thereby calculate a new adjustment value based on the calculated pixel shift evaluation value, and pre-pixel shift photography is performed again with the calculated new adjustment value.

According to the above invention, the photographic optical system forms an image of the subject in the predetermined position, the image sensing unit generates image data corresponding to the image of the subject, and the pixel shift mechanism control unit controls the pixel shift mechanism based on the adjustment value stored in the adjustment value storage unit to displace the image sensing unit by a predetermined amount. The image combining unit generates image data for one image by combining image data for the plurality of images output before and after the displacement of the image sensing unit. The pixel shift evaluation value calculation unit calculates a pixel shift evaluation value for judging whether the pixel shift photography has been normally performed or not, based on the image data for a plurality of images output before and after the displacement of the image sensing unit. The pixel shift photography control unit controls to execute an operation repetitively in which, when a continuous pixel shift mode is selected, a pre-pixel shift photography is executed by setting an adjustment value in the pixel shift mechanism, the pixel shift evaluation value calculation unit calculates the pixel shift evaluation value to thereby calculate a new adjustment value based on the calculated pixel shift evaluation value, and pre-pixel shift photography is performed again with the calculated new adjustment value.

The image input method, capable of performing pixel shift photography, according to still another aspect of this invention comprises the steps of: acquiring a first image data corresponding to an image of a subject with an image sensing unit; displacing the image sensing unit by a predetermined amount; acquiring a second image data corresponding to an image of the subject with the image sensing unit after the displacement of the image sensing unit; generating image data for one image by combing the first image data and the second image data; and judging whether the pixel shift photography has been normally performed or not, based on the first image data and the second image data.

According to the above invention, a subject image is imaged on the image sensing unit to output first image data, the image sensing unit is displaced by a predetermined amount, the subject image is imaged on the image sensing unit displaced by the predetermined amount to output second image data, image data for one image is generated based on the first image data and the second image data, and it is judged whether the pixel shift photography has been normally performed or not, based on the first image data and the second image.

The image input method, capable of performing pixel shift photography, according to still another aspect of this invention comprises the steps of: acquiring a first image data corresponding to an image of a subject with an image sensing unit; displacing the image sensing unit by a predetermined amount by a pixel shift mechanism; acquiring a second image data corresponding to an image of the subject with the image sensing unit after the displacement of the image sensing unit; generating image data for one image by combining the first image data and the second image data; calculating a pixel shift evaluation value for judging whether the pixel shift photography has been normally performed or not, based on the first image data and the second image data; storing the pixel shift evaluation value in a storage unit; and judging a failure or normal operation of the pixel shift mechanism, based on the pixel shift evaluation values obtained by performing the pixel shift photography for several times and stored in said storage unit and are stored in the storage unit.

According to the above invention, a subject image is imaged on the image sensing unit to output first image data, the image sensing unit is displaced by a predetermined amount by the pixel shift mechanism, the subject image is imaged on the image sensing unit displaced by the predetermined amount to output second image data, and image data for one image is generated based on the first image data and the second image data. The pixel shift evaluation value for judging whether the pixel shift photography has been normally performed or not is calculated based on the first image data and the second image data. The pixel shift evaluation value is stored in the storage unit, and it is judged if there is a failure of the pixel shift mechanism, based on the pixel shift evaluation values obtained by performing the pixel shift photography for several times and stored in said storage unit and stored in the storage unit.

The image input method, capable of performing pixel shift photography, according to still another aspect of this invention comprises the steps of: acquiring a first image data corresponding to an image of a subject with an image sensing unit; displacing the image sensing unit by a predetermined amount by driving a pixel shift mechanism based on an adjustment value stored in a storage unit; acquiring a second image data corresponding to an image of the subject with the image sensing unit after the displacement of the image sensing unit; generating image data for one image based on the first image data and the second image data; and executing pre-pixel shift photography once or plural times, when a self calibration mode is selected to calculate a pixel shift evaluation value for judging whether the pixel shift photography has been normally performed or not based on the first image data and the second image data; and calculating a new adjustment value by re-calculating the adjustment value, based on the calculated pixel shift evaluation value; to change the adjustment value stored in the storage unit to the new adjustment value.

According to the above invention, a subject image is imaged on the image sensing unit to output first image data, the pixel shift mechanism is driven based on an adjustment value stored in a storage unit to displace the image sensing unit by a predetermined amount, and the subject image is imaged on the image sensing unit displaced by the predetermined amount to output second image data. One image data is generated based on the first image data and the second image data, and when the self calibration mode is selected, pre-pixel shift photography is executed once or plural times, to calculate a pixel shift evaluation value for judging whether the pixel shift photography has been normally performed or not based on the first image data and the second image data. Based on the calculated pixel shift evaluation value, a new adjustment value is calculated by re-calculating the adjustment value, to change the adjustment value stored in the storage unit to the new adjustment value.

The image input method, capable of performing pixel shift photography, according to still another aspect of this invention comprises: a first step of acquiring a first image data corresponding to an image of a subject with an image sensing unit; a second step of displacing the image sensing unit by a predetermined amount by driving a pixel shift mechanism based on an adjustment value stored in a storage unit; a third step of acquiring a second image data corresponding to an image of the subject with the image sensing unit after the displacement of the image sensing unit; a fourth step of calculating a pixel shift evaluation value for judging whether the pixel shift photography has been normally performed or not based on the first image data and the second image data; a fifth step of calculating a new adjustment value by re-calculating the adjustment value, based on the calculated pixel shift evaluation value, and changing the adjustment value stored in the storage unit to the new adjustment value; a sixth step of repeating the first to fifth steps for a predetermined number of times, or until the new adjustment value becomes within a predetermined range; and a seventh step of performing pixel shift photography with the final adjustment value.

According to the above invention, a subject image is imaged on the image sensing unit to output first image data, the pixel shift mechanism is driven based on an adjustment value stored in a storage unit to displace the image sensing unit by a predetermined amount, and the subject image is imaged on the image sensing unit displaced by the predetermined amount to output second image data. The pixel shift evaluation value for judging whether the pixel shift photography has been normally performed or not is calculated based on the first image data and the second image data. A new adjustment value is calculated by re-calculating the adjustment value based on the calculated pixel shift evaluation value, to change the adjustment value stored in the storage unit to the new adjustment value. The above operation is repeated for a predetermined number of times, or until the new adjustment value becomes within a predetermined range, and pixel shift photography is performed with the final adjustment value.

The computer readable recording medium according to another aspect of the present invention stores a computer program which when executed realizes the method according to the present invention.

Other objects and features of this invention will become apparent from the following description with reference to the accompanying drawings.

BRIEF DESCRIPTION OF THE DRAWINGS

FIG. 5A to FIG. 5C are diagrams for explaining a method of calculating the coincidence degree of an image in a pixel shift evaluation value and reliability calculation section in FIG. 1;

FIG. 6A and FIG. 6B are diagrams for explaining a method of calculating the amount of shift of an image in the pixel shift evaluation value and reliability calculation section;

FIG. 7A to FIG. 7D are diagrams for explaining a method of calculating the amount of shift of an image in the pixel shift evaluation value and reliability calculation section;

FIG. 8A to FIG. 8D are diagrams for explaining a method of calculating the amount of shift of an image in the pixel shift evaluation value and reliability calculation section;

FIG. 9A to FIG. 9D are diagrams for explaining a method of calculating the amount of shift of an image in the pixel shift evaluation value and reliability calculation section;

FIG. 10A to FIG. 10D are diagrams for explaining a method of calculating the amount of shift of an image in the pixel shift evaluation value and reliability calculation section;

FIG. 17 is a flowchart for explaining the operation of pixel shift photography of a digital camera according to a second embodiment;

FIG. 19 is a flowchart for explaining the operation of pixel shift photography of a digital camera according to a third embodiment;

FIG. 21A to FIG. 21H are diagrams for explaining the method of calculating an adjustment value in the self calibration mode;

FIG. 24 is a diagram for explaining a method of calculating an optimum adjustment value from adjustment values in two points;

FIG. 25 is a diagram for explaining a method of calculating an optimum adjustment value from an adjustment values in one point;

FIG. 26 is a flowchart for explaining the operation of pixel shift photography of a digital camera according to the second embodiment;

FIG. 28A to FIG. 28C are diagrams for explaining the principle of pixel shift and image deterioration.

DESCRIPTION OF THE PREFERRED EMBODIMENTS

Embodiments of a digital camera applying the image input unit and the image input method according to the present invention will now be described in detail below with reference to the accompanying drawings. In this specification, the term "pixel shift evaluation value" is used to mean both "an amount of shift" and "a degree of coincidence" ("coincidence degree").

Figure 1:
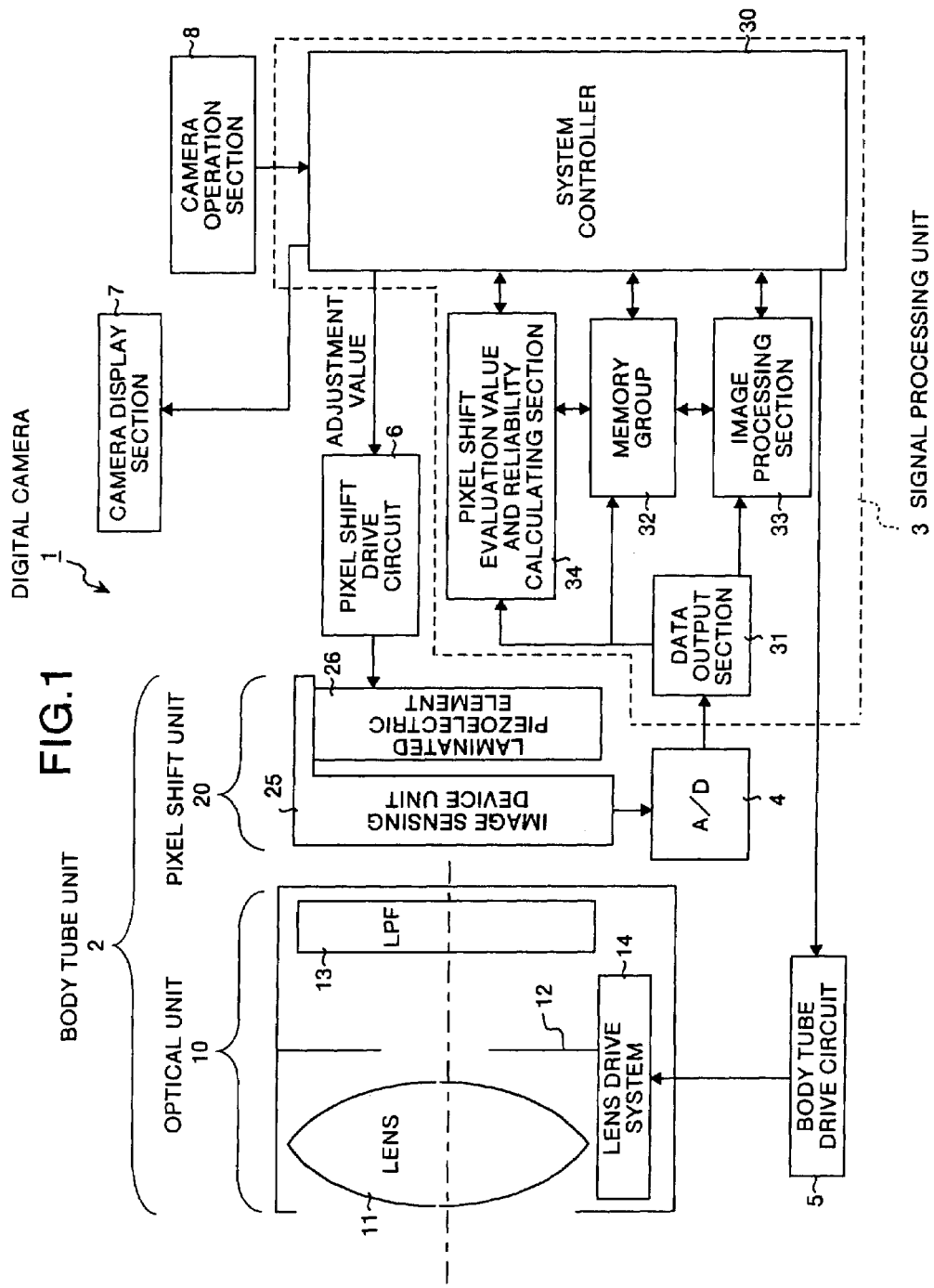
FIG. 1 is a block diagram showing the construction of a digital camera according to a first embodiment.

The digital camera according to the first embodiment will now be described with reference to FIG. 1 to FIG. 16B. FIG. 1 is a block diagram showing the construction of a digital camera according to the first embodiment.

FIG. 1 is a block diagram showing the construction of the digital camera 1 according to this embodiment. This digital camera 1 comprises a body tube unit 2 for obtaining the analog image data by imaging a subject, and a signal processing unit 3 for processing digital image data obtained by digitalizing the analog image data obtained by this body tube unit 2. The signal processing unit 3 outputs the processed data to the outside.

The digital camera 1 is provided with an A/D converter 4 for A/D converting the image data is provided between the body tube unit 2 and the signal processing unit 3. A camera operation section 8 is provided for generating a signal depending on the operation of a mode switch (not shown) or the like and outputting this signal to the signal processing unit 3. A camera display section 7 is provided for displaying the photographed image data or the like. This camera display section 7 is connected to the signal processing unit 3. A pixel shift drive circuit 6 drives a laminated piezoelectric element 26 of a pixel shift unit 20 in accordance with an adjustment value output from a system controller 30. A body tube drive circuit 5 drives a lens drive system 14 in accordance with a control signal output from the system controller 30.

The body tube unit 2 is constituted of an optical unit 10 and the pixel shift unit 20. The optical unit 10 comprises a lens 11 for forming an image of a subject, a shutter mechanism 12 (mechanical shutter, stop, etc.) for shading the light shone onto the lens 11 with an optical mechanism, an LPF (low-pass filter) 13, and a lens drive system 14 for moving the lens 11 and driving the shutter mechanism 12, in accordance with the control of the signal processing unit 3.

The pixel shift unit 20 has an image sensing device unit 25 including an image sensing device for receiving the light shone onto the lens 11 and converting the light to an electric signal (analog image data), and a laminated piezoelectric element 26 arranged on the back side of the image sensing device for performing a pixel shift by moving the light-receiving plane of the image sensing device in parallel to the image-forming surface (in the vertical direction with respect to the optical axis), in accordance with the control of the signal processing unit 3, to change the imaging range of the same subject. The output of the image sensing device is supplied to the A/D converter 4.

The signal processing unit 3 has, for example, the system controller 30, a data output section 31, a memory group 32 consisting of a plurality of memories, an image processing section 33, and a pixel shift evaluation value and reliability calculating section 34.

The data output section 31 is connected to the output of the A/D converter 4 and inputs the digital image data, and outputs the input digital image data to either one of memories in the memory group 32 on the subsequent stage, in accordance with the control of the system controller 30.

The memory group 32 has a plurality of memories, and uses one memory for storing image data for one imaging, and reads the digital image data from one memory to supply the digital image data to the image processing section 33 on the subsequent stage, under control of the system controller 30.

The pixel shift evaluation value and reliability calculating section 34 calculates a pixel shift evaluation value for judging whether the pixel shift photography has been normally performed or not based on the image data before and after the pixel shift stored in the memory group 32, and reliability data indicating the reliability of this pixel shift evaluation value, and outputs these data to the system controller 30. As described above, the pixel shift evaluation value and the reliability data are calculated for each of a plurality of operation areas in the image frame (see FIG. 12). As for the reliability data, for example, a value evaluating the contrast of the image data is used.

The image processing section 33 is for performing image combining processing based on the digital image data supplied from the memory group 32. Specifically, the image processing section 33 obtains a high resolution picture in the same subject corresponding to the amount of shift of pixel (for example, shifting one pixel in the longitudinal direction), at the time of changing the imaging range by the laminated piezoelectric element 26, and finally image data for one sheet is obtained.

The output of this image processing section 33 is connected to an external terminal (not shown), and by connecting it to an external equipment such as a personal computer, the data can be transmitted. The camera operation section 8 includes a release key for operating an electronic shutter or a shutter mechanism 12 to perform imaging, a mode button for setting various modes (pixel shift photography mode) or the like.

The camera display section 7 consists of, for example, an LCD, and image data and necessary information are displayed thereon, in accordance with the display control of the system controller 30. The system controller 30 displays the result of judgment whether the pixel shift photography has been normally performed or not in the camera display section 7 for informing the user, when the user performs the pixel shift photography. In the case where the abnormal situation in the pixel shift photography is informed, not only the display on the display screen but also voice, alarm sound, vibrations or the like may be used for informing the user of the abnormality.

The system controller 30 is connected to each of the lens drive system 14 of the optical unit 10, the image sensing device and the laminated piezoelectric element 26 of the pixel shift unit 20, the A/D converter 4, the data output section 31, the memory group 32, the image processing section 33, the body tube drive circuit 5, the pixel shift drive circuit 6, the camera display section 7, the camera operation section 8, and the pixel shift drive circuit 6, for controlling the imaging operation, the A/D conversion, read and write of the memory, pixel shift and operations in response to the key input. The system controller 30 is constituted of a microcomputer or the like, and operates the microcomputer in accordance with various programs stored in the ROM beforehand to thereby execute control of each unit and the operation processing. In the pixel shift photography mode, the system controller 30 judges whether the pixel shift photography has been normally performed or not, based on the pixel shift evaluation value and the reliability data calculated by the pixel shift evaluation value and reliability calculating section 34, and displays the judgment result in the camera display section 7.

Figure 2:
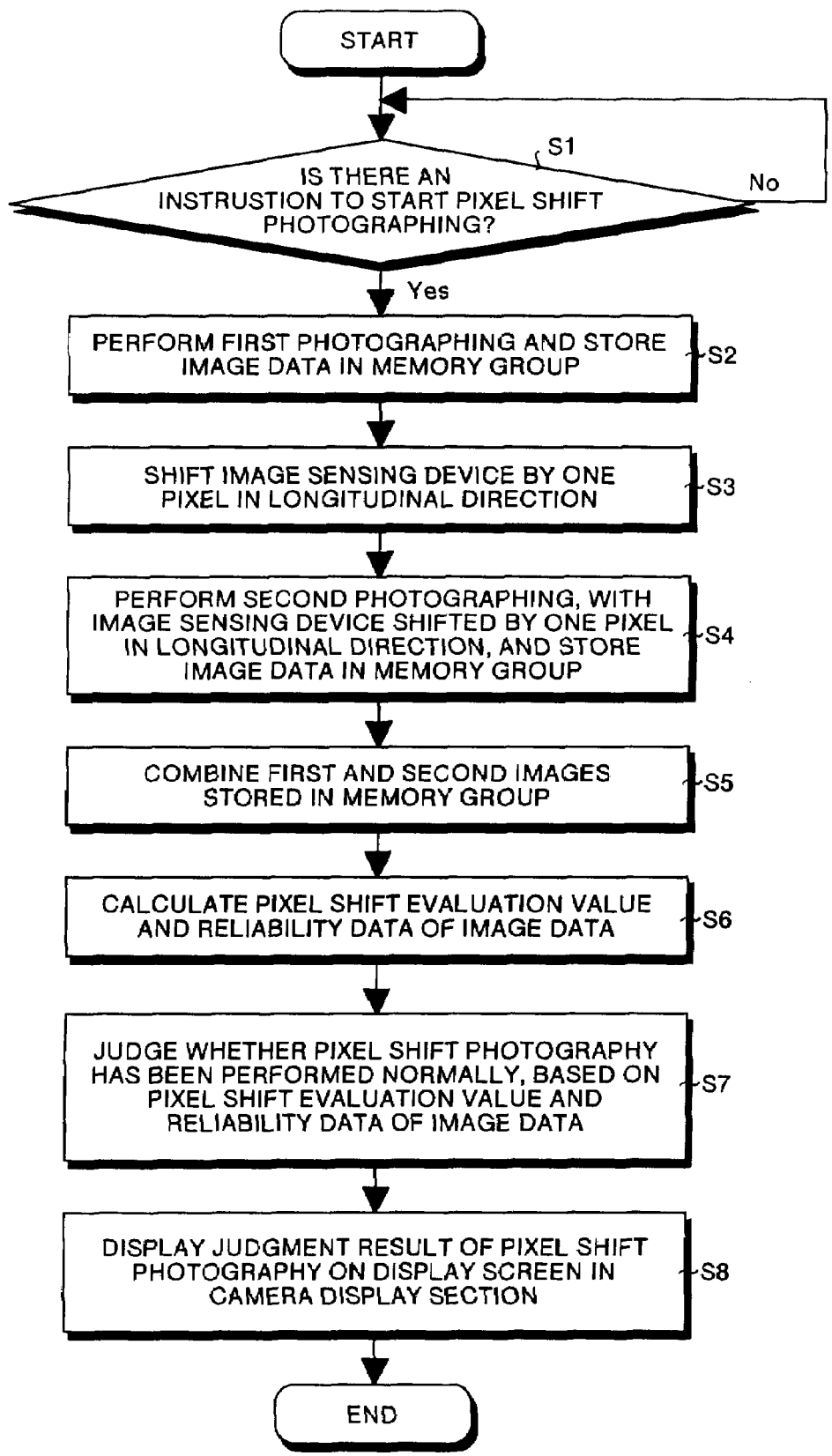
FIG. 2 is a flowchart for explaining the operation of pixel shift photography of a digital camera according to the first embodiment.

The pixel shift photography operation of the digital camera in FIG. 1 will now be described with reference to the flowchart in FIG. 2. When an instruction to start the pixel shift photography is input from the camera operation section 8 (step S1), the first photographing is performed and the image data is stored in the memory group 32 (step S2). Then, the system controller 30 outputs an adjustment value for shifting the image sensing device by one pixel in the longitudinal direction to the pixel shift drive circuit 6, to thereby drive the pixel shift unit 20 via the pixel shift drive circuit 6, so that the image sensing device is shifted (pixel shift) by one pixel in the longitudinal direction (step S3). The second photographing is performed, with the image sensing device shifted by one pixel in the longitudinal direction, and the image data is stored in the memory group 32 (step S4).

The image processing section 33 generates the image data having a high resolution, by combining the first image data and the second image data stored in the memory group 32 (step S5). After completion of the pixel shift photography, the pixel shift evaluation value and reliability calculating section 34 calculates the pixel shift evaluation value and the reliability data of the image data, for every operation area of the image data, based on the first image data and the second image data (image data before and after the pixel shift) stored in the memory group 32 (step S6), and output the pixel shift evaluation value and the reliability data to the system controller 30. The system controller 30 judges whether the pixel shift photography has been performed normally, based on the pixel shift evaluation value and the reliability data of the image data calculated by the pixel shift evaluation value and reliability calculating section 34 (step S7). Thereafter, the system controller 30 displays the judgment result of the pixel shift photography on the display screen in the camera display section 7 (step S8).

Figure 3:
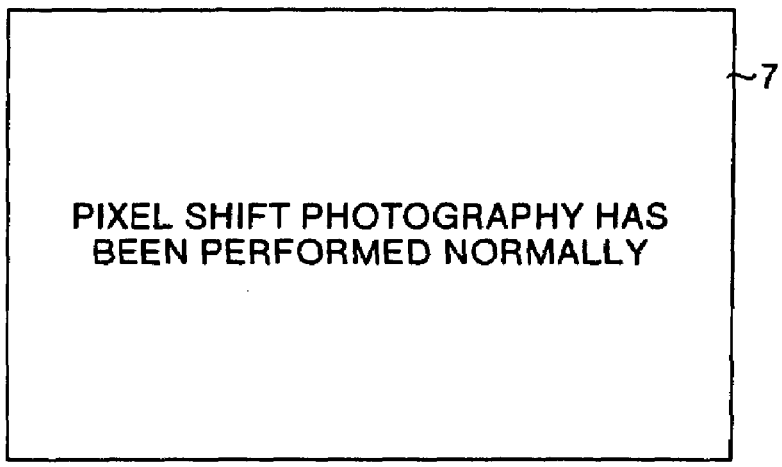
FIG. 3 is a diagram showing a display example of a camera display section in FIG. 1.
Figure 4:
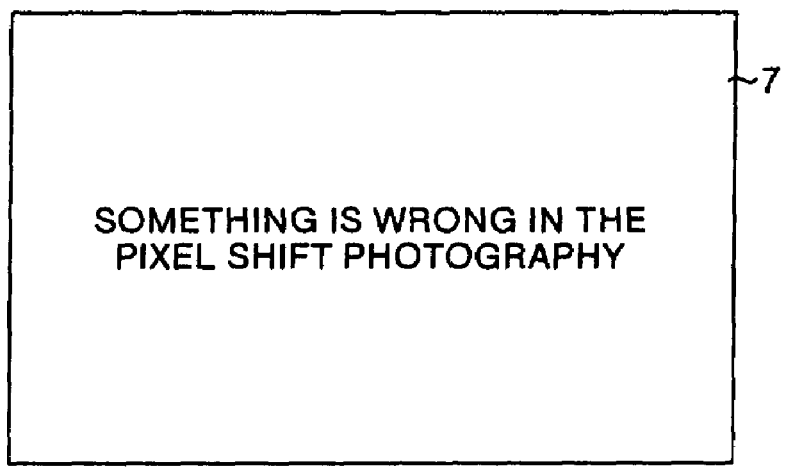
FIG. 4 is a diagram showing a display example of the camera display section in FIG. 1.

FIG. 3 and FIG. 4 show display examples of the camera display section 7. When judging that the pixel shift photography has been performed normally, the system controller 30 displays, as shown in FIG. 3, for example, "Pixel shift photographing has been performed normally", on the display screen in the camera display section 7. On the other hand, judging that the pixel shift photography has not been performed normally, the system controller 30 displays, as shown in FIG. 4, for example, "Something is wrong in the pixel shift photography", on the display screen in the camera display section 7.

The method of calculating the pixel shift evaluation value by the pixel shift evaluation value and reliability calculating section 34 in the above step S5 will now be described in detail. As the pixel shift evaluation value, (1) the coincidence degree of the image and (2) the amount of shift of the image can be used. A user can set which of (1) the coincidence degree of the image or (2) the amount of shift of the image is used as the pixel shift evaluation value, by a button in the camera operation section 8.

(1) Method of Calculation of the Coincidence Degree of the Image:

The method of calculating the coincidence degree of the image by the pixel shift evaluation value and reliability calculating section 34 will be described in detail with reference to FIG. 5A and FIG. 5B.

FIG. 5A shows a photographed image 1 photographed before the shift of the image sensing device, FIG. 5B shows a photographed image 2 photographed after the shift of the image sensing device (after the image sensing device has been shifted by one pixel in the longitudinal direction), and FIG. 5C shows a target image in the case where an ideal pixel shift has been performed. This target image indicates an image ideally shifted by one pixel in the longitudinal direction from the photographed image 1. The pixel shift evaluation value and reliability calculating section 34 produces the target image ideally shifted by one pixel in the longitudinal direction from the photographed image 1.

Then, the pixel shift evaluation value and reliability calculating section 34 calculates the coincidence degree between the photographed image 2 and the target image. When the coincidence degree is "1", it can be judged that the ideal pixel shift has been performed. When the coincidence degree is abnormal, the coincidence degree decreases 0.99, 0.98, . . . depending on the abnormal degree.

If this target image and the photographed image 2 coincide with each other completely, that is, when the coincidence degree is "1", it can be said that ideal pixel shift photography has been performed. The correlation coefficient between these images is calculated as the coincidence degree of these two images. The correlation coefficient r can be calculated by using a formula by, for example, a pattern matching method as described below.

$$r = \frac{N\sum IM - (\sum I)\sum M}{\sqrt{[N\sum I^2 - (\sum I)^2][N\sum M^2 - (\sum M)^2]}} \quad (1)$$

In the equation (1), M denotes a reference image and I denotes a comparison image. The correlation coefficient herein is calculated using the pattern matching method, but other methods may be used.

In the pattern matching method, the ideal state is the coincidence degree=1, and as the coincidence degree decreases, the state becomes far from the ideal state. With the pattern matching method, in the case where the coincidence degree is not "1", it cannot be judged how much degree is abnormal in which direction of the longitudinal direction or the lateral direction, but there is a merit in that the operation time is relatively short.

(2) Method of Calculation of the Amount of Shift of the Image:

The method of calculating the amount of shift of the image by the pixel shift evaluation value and reliability calculating section 34 will be described with reference to FIG. 6A to FIG. 11. The method of calculating the amount of shift can judge abnormality in the direction of the pixel shift and in the amount.

FIG. 6A shows a photographed image 1 photographed before the shift of the image sensing device, and FIG. 6B shows a photographed image 2 photographed after the shift of the image sensing device.

Of the photographed image 1 and the photographed image 2 before and after the shift of the image sensing device, either one is fixed, and the other is shifted in the operation (not shifted physically, but imaginary shift is performed in the operation). By calculating the mutual correlation coefficient, it is calculated how much and which direction of the shift makes the correlation coefficient largest.

FIG. 7A to FIG. 10D show one example of the relation between the amount of shift in the X direction (lateral direction) and the Y direction (longitudinal direction) and the correlation coefficient of the shifted image and the photographed image 1, when the photographed image 2 is shifted in the X direction (lateral direction) and the Y direction (longitudinal direction). The value of the correlation coefficient in the figure and in the description below is not an actually calculated value, but a numerical value exaggerated for explanation.

FIG. 7A shows a case where the photographed image 2 is shifted by one pixel in the plus direction in the X direction (lateral direction), and the correlation coefficient with respect to the photographed image 1 in this case becomes "0.45". FIG. 7B shows a case where the photographed image 2 in FIG. 7A is shifted by one pixel in the minus direction in the Y direction (longitudinal direction), and the correlation coefficient with respect to the photographed image 1 in this case becomes "0.7". FIG. 7C shows a case where the photographed image 2 in FIG. 7B is shifted by one pixel in the minus direction in the Y direction (longitudinal direction), and the correlation coefficient with respect to the photographed image 1 in this case becomes "0.65". FIG. 7D shows a case where the photographed image 2 in FIG. 7C is shifted by one pixel in the minus direction in the Y direction (longitudinal direction), and the correlation coefficient with respect to the photographed image 1 in this case becomes "0.4".

FIG. 8A shows a case where the photographed image 2 is shifted by 0 pixel in the plus direction in the X direction (lateral direction), and the correlation coefficient with respect to the photographed image 1 in this case becomes "0.7". FIG. 8B shows a case where the photographed image 2 in FIG. 8A is shifted by one pixel in the minus direction in the Y direction (longitudinal direction), and the correlation coefficient with respect to the photographed image 1 in this case becomes "0.95". FIG. 8C shows a case where the photographed image 2 in FIG. 8B is shifted by one pixel in the minus direction in the Y direction (longitudinal direction), and the correlation coefficient with respect to the photographed image 1 in this case becomes "0.9". FIG. 8D shows a case where the photographed image 2 in FIG. 8C is shifted by one pixel in the minus direction in the Y direction (longitudinal direction), and the correlation coefficient with respect to the photographed image 1 in this case becomes "0.65".

FIG. 9A shows a case where the photographed image 2 is shifted by one pixel in the minus direction in the X direction (lateral direction), and the correlation coefficient with respect to the photographed image 1 in this case becomes "0.6". FIG. 9B shows a case where the photographed image 2 in FIG. 9A is shifted by one pixel in the minus direction in the Y direction (longitudinal direction), and the correlation coefficient with respect to the photographed image 1 in this case becomes "0.85". FIG. 9C shows a case where the photographed image 2 in FIG. 9B is shifted by one pixel in the minus direction in the Y direction (longitudinal direction), and the correlation coefficient with respect to the photographed image 1 in this case becomes "0.8". FIG. 9D shows a case where the photographed image 2 in FIG. 9C is shifted by one pixel in the minus direction in the Y direction (longitudinal direction), and the correlation coefficient with respect to the photographed image 1 in this case becomes "0.55".

FIG. 10A shows a case where the photographed image 2 is shifted by two pixels in the minus direction in the X direction (lateral direction), and the correlation coefficient with respect to the photographed image 1 in this case becomes "0.3". FIG. 10B shows a case where the photographed image 2 in FIG. 10A is shifted by one pixel in the minus direction in the Y direction (longitudinal direction), and the correlation coefficient with respect to the photographed image 1 in this case becomes "0.6". FIG. 10C shows a case where the photographed image 2 in FIG. 10B is shifted by one pixel in the minus direction in the Y direction (longitudinal direction), and the correlation coefficient with respect to the photographed image 1 in this case becomes "0.55". FIG. 10D shows a case where the photographed image 2 in FIG. 10C is shifted by one pixel in the minus direction in the Y direction (longitudinal direction), and the correlation coefficient with respect to the photographed image 1 in this case becomes "0.25".

Figure 11:
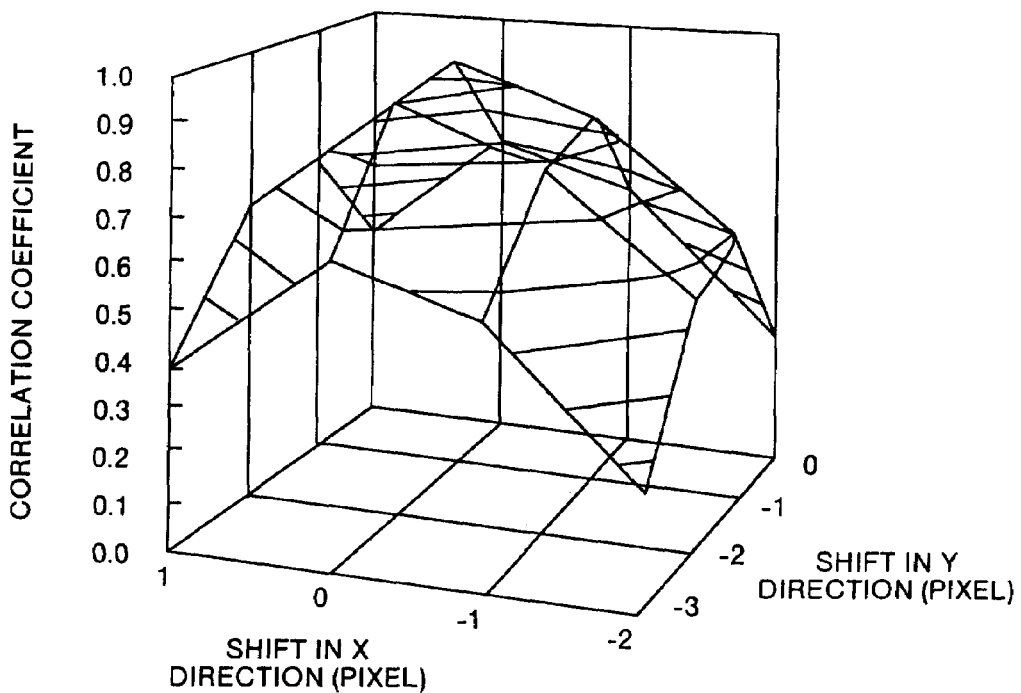
FIG. 11 is a diagram for explaining a method of calculating the amount of shift of an image in the pixel shift evaluation value and reliability calculation section.

FIG. 11 shows a graph in which the correlation coefficient with respect to the amount of shift in the X direction (lateral direction) and the Y direction (longitudinal direction) is plotted. The pixel shift evaluation value and reliability calculating section 34 calculates the correlation coefficient with the interpolation operation up to a unit of 0.01 pixel, to thereby calculate the amount of shift in the lateral direction and in the longitudinal direction, when the correlation coefficient becomes largest.

In the above example, the description has been made for a case where the photographed image 1 is fixed, and the photographed image 2 is shifted, but the photographed image 2 is fixed and the photographed image 1 may be shifted. In this case, only the symbol of the calculated amount of shift is changed.

With the above method of calculating the amount of shift, two-dimensional interpolation operation is performed, taking the longitudinal direction and the lateral direction into consideration, by shifting the image in the two directions, that is, the longitudinal direction and the lateral direction. Therefore, the operation time becomes long, but the direction and amount of the shift can be calculated, which is convenient for various judgment.

In order to reduce the operation time, there can be considered such a simple method that the lateral direction (the direction originally not shifted) is ignored, and only the longitudinal direction is calculated. However, in this case, it is assumed that the amount of shift in the lateral direction is always within a certain range, and movement of hands in the lateral direction cannot be detected.

Figure 12:
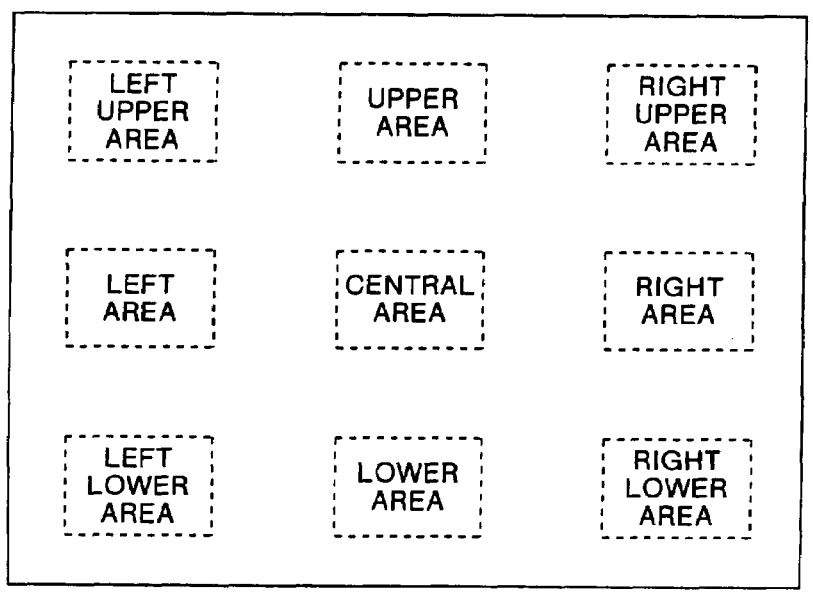
FIG. 12 is a diagram showing one example of an operation area in an image frame.

FIG. 12 shows one example of the operation area in the image frame. In the example shown in this figure, the center of the screen and the peripheral areas (central area, left upper area, upper area, right upper area, left area, right area, left lower area, lower area and right lower area) are set as the operation area. The pixel shift evaluation value and reliability calculating section 34 calculates the amount of shift and the coincidence degree separately for each operation area. The pixel shift evaluation value and reliability calculating section 34 also calculates the reliability data indicating the reliability of the amount of shift and the coincidence degree separately for each operation area.

The photographed image before and after the shift of the image sensing device and the amount of shift in each operation area in the photographed image will be described. FIG. 13A to FIG. 16B are diagrams for explaining the relation between the photographed image before and after the shift of the image sensing device and the amount of shift in each operation area.

The judgment standard for judging normal or abnormal pixel shift photography in the system controller 30 will be described. In the case of the high resolution picture mode, it is judged that the pixel shift photography has been performed normally in the case where the amount of shift is within 1±0.1 pixel in the longitudinal and 0±0.1 pixel in the lateral direction (within a predetermined range). On the other hand, in the case of the normal resolution picture mode, it is judged that the pixel shift photography has been performed normally in the case where the amount of shift is within 1±0.3 pixel in the longitudinal and 0±0.3 pixel in the lateral direction (within a predetermined range). In this manner, by calculating the amount of shift for each operation area, much information can be obtained compared to the method of calculating one amount of shift and amount of shift from the whole screen, thereby enabling fine judgment.

Figures 13A, 13B:
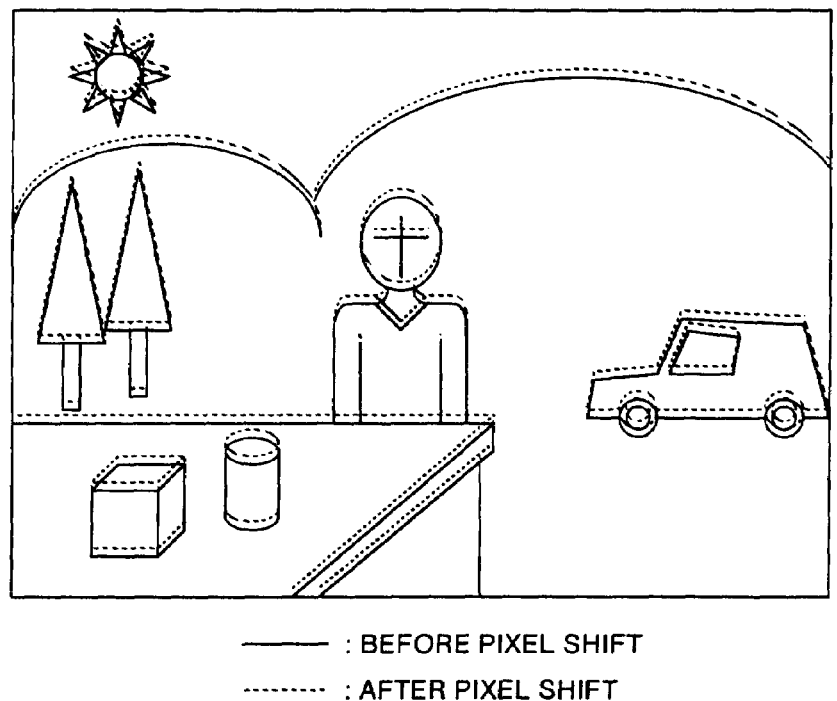
FIG. 13A and FIG. 13B are diagrams for explaining the relation between the imaged image before and after a shift of an image sensing unit and the amount of shift in each operation area.
Figures 14A, 14B:
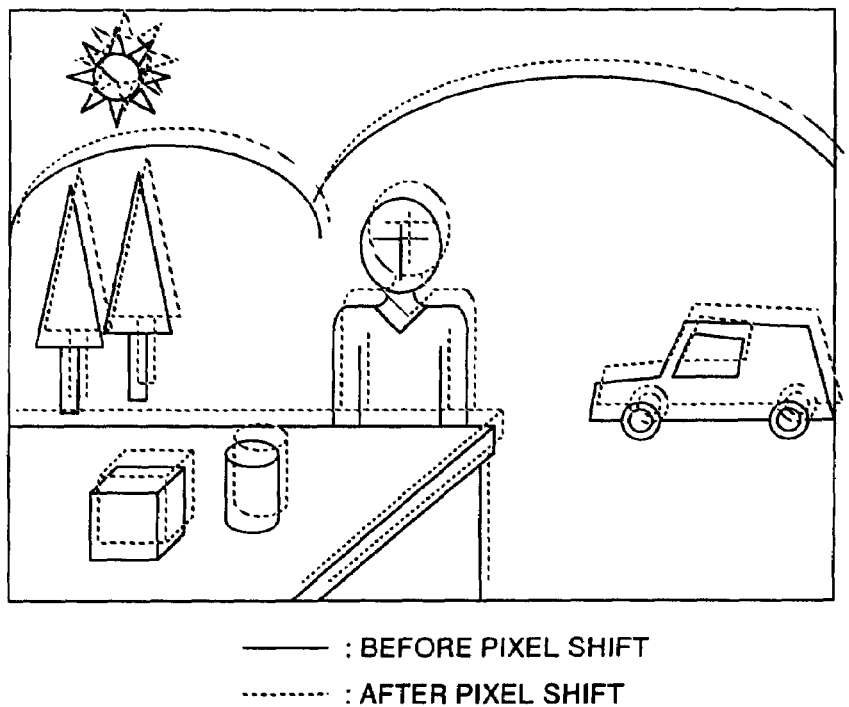
FIG. 14A and FIG. 14B are diagrams for explaining the relation between the imaged image before and after a shift of an image sensing unit and the amount of shift in each operation area.
Figures 15A, 15B:
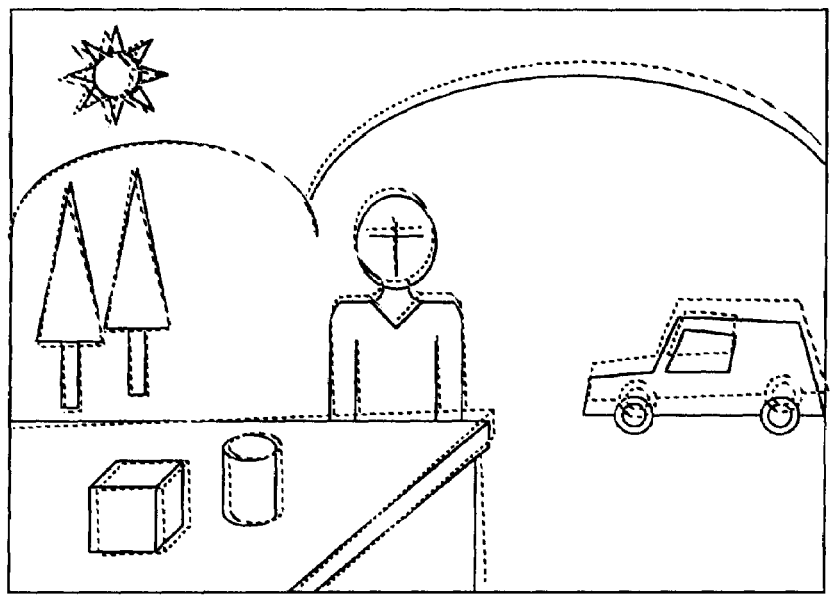
FIG. 15A and FIG. 15B are diagrams for explaining the relation between the imaged image before and after a shift of an image sensing unit and the amount of shift in each operation area.

FIG. 13A and FIG. 13B show a case where a normal pixel shift has been performed, and the amount of shift is within 1±0.1 pixel in the longitudinal and 0±0.1 pixel in the lateral direction in each operation area. The right lower operation area has a low contrast of the subject, and hence the reliability as the data is low. Moreover, this area includes a large probability of an error due to the low reliability. Therefore, it is not adequate as the data used for the judgment of normal or abnormal pixel shift photography. In order to exclude such data, by taking into consideration not only the amount of shift but also the reliability data in each operation area, it is judged whether the pixel shift photography has been performed normally. Specifically, at the time of judging the pixel shift photography, the system controller 30 does not use the amount of shift in the operation area having low reliability data, or reduces weighting of the amount of shift in this operation area (in the case where weighting operation is performed).

FIG. 14A, FIG. 14B, FIG. 15A, and FIG. 15B show a case of movement of hands or an abnormal situation of the pixel shift unit 20. If a phenomenon such as too much or too little longitudinal shift, or a lateral shift or a rotational shift occurs, as shown in FIG. 14A, FIG. 14B, FIG. 15A, and FIG. 15B, the data related to the amount of shift in the operation area becomes such that a predetermined relation is maintained, and a part of or the whole of the amount of shift becomes without the predetermined range.

The system controller 30 analyzes the data relating to the amount of shift data in each operation area in detail, to thereby judge if it is too much or too little longitudinal shift, a lateral shift, a rotational shift or a composite shift of these shifts. Here, it is difficult to judge whether the cause of this abnormal shift is due to movement of hands, or a failure of the pixel shift unit 20.

Presumptively, if it is obvious, from the property of the pixel shift unit 20, that "even if the pixel shift unit 20 has a failure, a lateral shift or a rotational shift does not occur", it may be possible to judge that it is due to "a failure or movement of hands", only in the case of too much or too little longitudinal shift, and that it is due to movement of hands in the case of the lateral shift and the rotational shift. However, as described below, with regard to the "failure judgment", "when similar abnormal situation occurs substantially continuously", it is judged as a failure.

Figure 16A:
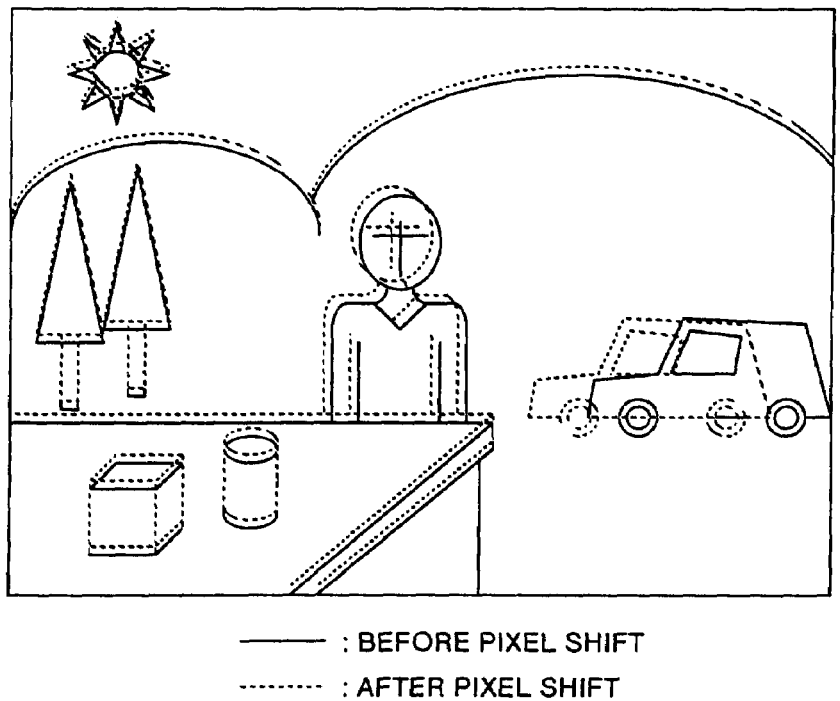
FIG. 16A and FIG. 16B are diagrams for explaining the relation between the imaged image before and after a shift of an image sensing unit and the amount of shift in each operation area.
Figure 16B:
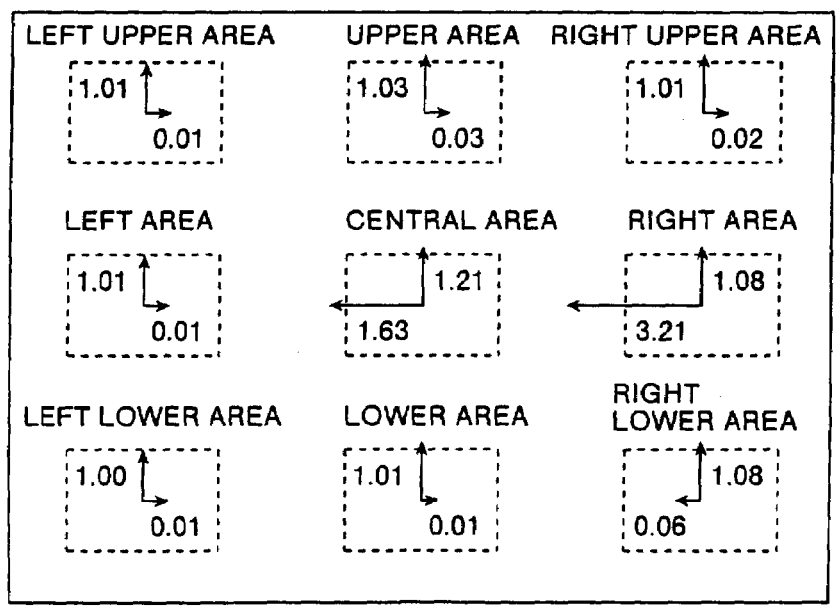

FIG. 16A and FIG. 16B show a case where even if there is no movement of hands and the pixel shift unit 20 is normal, pixel shift photography becomes abnormal due to movement of the subject, and in particular, a case where a part of the data relating to the amount of shift in the operation area does not maintain a predetermined relation. In the example shown in this figure, the amount of shift in the central area and the right area are obviously abnormal compared to the amount of shift in other seven operation areas (left upper, upper, right upper, left, left lower, lower and right lower areas), and hence it can be judged that the subjects in these portions (in the central area and the right area) have moved.

That is to say, the system controller 30 judges that the pixel shift photography has been performed normally, when the whole image is shifted normally (when the amount of shift is within the allowable range), based on the amount of shift in each operation area in the image frame.

Moreover, when the amount of shift in the operation area is not normal partly or wholly (when the amount of shift is without the allowable range), and when the whole image is shifted, keeping a certain relation, the system controller 30 judges that the amount of shift is abnormal due to movement of hands or a problem of the pixel shift unit 20.

When the amount of shift in the operation area is not normal partly or wholly (when the amount of shift is without the allowable range), and when there is no certain relation mutually (when only a part is abnormally shifted), the system controller 30 judges that the pixel shift photography is abnormal due to movement of the subject.

The system controller 30 may display the cause of the abnormal situation of the pixel shift photography (movement of hands, problem of the pixel shift unit 20, movement of the subject), together with the display that the pixel shift photography 7 is abnormal, as described above.

Description has been given for the amount of shift here, but it is the same for the case of the amount of shift. When it is necessary to reduce the operation time, only a part of the image (normally, the central portion) may be picked up for operation. In this case, the operation time can be made shorter, as the image area to be operated becomes smaller, but the accuracy decreases. Hence, a certain extent is required.

The method for judging the reliability evaluation of the image obtained by the pixel shift photography by the pixel shift evaluation value and reliability calculating section 34 will now be described in detail. The pixel shift evaluation value and reliability calculating section 34 calculates the reliability data for evaluating the reliability of the calculated pixel shift evaluation value (the amount of shift and the coincidence degree).

Specifically, the pixel shift evaluation value and reliability calculating section 34 detects the contrast of the image in each operation area in the image frame to calculate the reliability data corresponding to the contrast. For example, the reliability data is an evaluation value indicating that the reliability becomes higher with an increase of the contrast, as five-stage evaluation values. That is to say, since a subject having a low contrast (=a monotonous wall, etc.) has little information amount, the calculation error of the amount of shift and the coincidence degree increases. Therefore, a portion having a contrast less than a certain degree is not used for the operation, or weighting therefor is made low. Here, the reliability data is calculated based on the contrast of the image, but the reliability data may be calculated based on minuteness of the image (frequency), brightness of the image, repeatability of the image and the like, other than the contrast.

As described above, according to the first embodiment, in the pixel shift photography, the pixel shift evaluation value and reliability calculating section 34 calculates a pixel shift evaluation value (the amount of shift or the coincidence degree) based on the image data photographed before and after the shift of the image sensing device, and the system controller 30 judges the result of pixel shift photography based on the pixel shift evaluation value. Hence, a failure in the pixel shift photography caused by movement of hands, movement of the subject, or a problem of the pixel shift mechanism can be informed to the photographer, thereby the photographer can obtain a desired pixel shifted image by re-photographing or the like.

Also, according to the first embodiment, the pixel shift evaluation value and reliability calculating section 34 calculates the amount of shift between the photographed images before and after the shift of the image sensing device, and the system controller 30 judges whether the pixel shift photography has been performed normally, based on the amount of shift between the photographed images before and after the shift of the image sensing device. As a result, it becomes possible to judge whether the pixel shift photography is successful or not.

Moreover, according to the first embodiment, the pixel shift evaluation value and reliability calculating section 34 calculates a pixel shift evaluation value (the amount of shift or the coincidence degree) for each operation area in the image frame. Hence, it can be detected whether the pixel shift evaluation value (the amount of shift or the coincidence degree) is adequate or not in a plurality of points of the image, and as a result, more accurate judgment becomes possible with regard to the shift degree of the whole image.

More specifically, when the whole image is normally shifted, it is judged that the pixel shift photography has been performed normally, and when a part or the whole of the image is not normal, and the whole image is shifted, keeping a certain relation, it is judged to be abnormal due to a problem of the pixel shift unit 20. When a part of or the whole of the image is not normal, and there is no certain relation mutually (when only a part of the image is abnormally shifted), it is judged that the pixel shift photography is abnormal due to movement of the subject. As a result, it becomes possible to judge the reason of abnormality in the pixel shift photography.

According to the first embodiment, the pixel shift evaluation value and reliability calculating section 34 calculates the reliability data for evaluating the reliability of the calculated pixel shift evaluation value (the amount of shift and the coincidence degree), and the system controller 30 calculates the reliability data based on the amount of shift in each operation area, taking the reliability data into consideration, at the time of judgment of the pixel shift photography. Hence, at the time of judgment of the pixel shift photography, the pixel shift evaluation value in the operation area having a large influence of noise is not used, or weighting therefor can be made small. As a result, erroneous judgment of the pixel shift photography can be prevented.

According to the first embodiment, since the reliability data is also calculated based on the contrast information of the subject (image), the pixel shift evaluation value in the operation area having a low contrast, and hence having a large probability of an error can be taken into account, thereby enabling more accurate judgment of the pixel shift.

Furthermore, according to the first embodiment, since the judgment result of the pixel shift photography is displayed in the camera display section 7, the photographer is informed of abnormal pixel shift photography. As a result, the photographer can take suitable measures (measures for preventing movement of hands or restricting movement of the subject, making a service call, etc.).

A digital camera according to the second embodiment will now be described with reference to FIG. 17 and FIG. 18. In the digital camera in the second embodiment, it is judged whether the pixel shift unit 20 has a failure or not based on the data of the pixel shift photography performed before (pixel shift photography relational data), and an adjustment value for driving the pixel shift unit 20 is automatically changed. The function for automatically changing the adjustment value for driving the pixel shift unit 20 is referred to herein as a "self calibration function".

The digital camera according to the second embodiment has a construction that is similar to that of the digital camera in the first embodiment (see FIG. 1), and hence only the different point between these will be described here.

In addition to the photographed image data, the adjustment value for driving the pixel shift unit 20 and the pixel shift photography relational data (pixel shift evaluation value (the amount of shift or the coincidence degree) and the reliability data) are stored in the memory group 32. The system controller 30 stores, in the memory group 32, the pixel shift photography relational data (the pixel shift evaluation value and the reliability data) calculated by the pixel shift evaluation value and reliability calculating section 34, every time the pixel shift photography is performed.

The system controller 30 also judges whether the pixel shift unit 20 has a failure or not, based on the pixel shift photography relational data (the pixel shift evaluation value, the reliability data, etc.) obtained by performing the pixel shift photography for several times, which is stored in the memory group 32. Specifically, the system controller 30 judges that the pixel shift unit 20 has a "failure", in the case where "abnormality having a similar tendency occurs substantially continuously, for a predetermined number of times", in the pixel shift evaluation value. For example, assuming a case where abnormality having another tendency happens to occur due to movement of hands, the system controller 30 judges as a failure of the pixel shift unit 20, when "the same problem occurred 6 times or more in the last ten cases". In the case where a failure in the pixel shift unit 20 is judged by using the coincidence degree, it is difficult to judge whether it is "the same tendency" or not. Hence, the accuracy in the failure judgment may decrease, however, the operation time can be made short. Therefore, the method is selected depending on which is given priority, time or accuracy.

Moreover, when an instruction to start the pixel shift photography is input, the system controller 30 executes the self calibration mode, in which the adjustment value for driving the pixel shift unit 20 is automatically changed.

In the camera operation section 8, the photographing frequency (predetermined number) in the pixel shift photography relational data (the pixel shift evaluation value, the reliability data, etc.) stored in the memory group 32 can be set. For example, when "5" is set as the photographing frequency, the pixel shift photography relational data calculated at the time of the pixel shift photography of the last five times is stored in the memory group 32. The data before that is deleted. The camera operation section 8 can change the adjustment value stored in the memory group 32 to a default value.

The pixel shift photography operation of the digital camera according to the second embodiment will now be described with reference to the flowchart in FIG. 17. FIG. 17 is a flowchart for explaining the operation of pixel shift photography. When an instruction to start the pixel shift photography is input from the camera operation section 8 (step S11), the system controller 30 judges whether there is a failure in the pixel shift unit 20 or not (step S12), based on the pixel shift photography relational data (the pixel shift evaluation value and the reliability data) of the last several times, which is stored in the memory group 32. When there is a failure in the pixel shift unit 20 (step S13), control proceeds to step S23, to thereby display in the camera display section 7 that there is a failure in the pixel shift unit 20.

Figure 18:
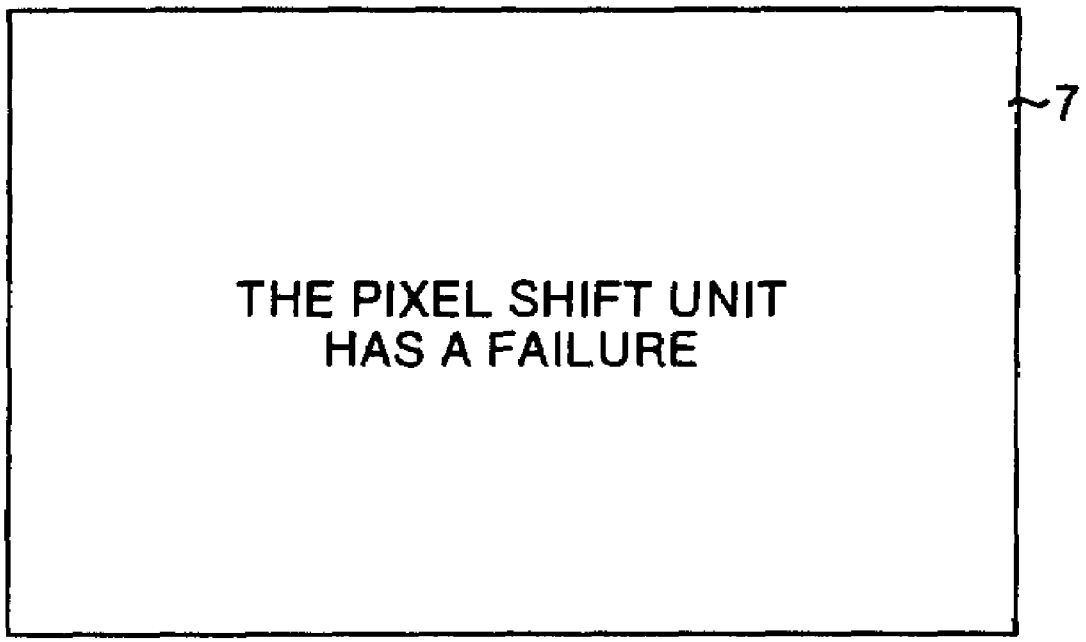
FIG. 18 is a diagram showing a display example of the camera display section.

FIG. 18 shows a display example of the camera display section 7. When the system controller 30 judges that there is a failure in the pixel shift unit, as shown in FIG. 18, displays "The pixel shift unit has a failure" on the display screen in the camera display section 7.

On the other hand, in step S13, when there is no failure in the pixel shift unit 20, control proceeds to step S14, and the system controller 30 judges that it is not a failure of the pixel shift unit 20, but if it is necessary to change the adjustment value for driving the pixel shift unit 20 or not (step S14), based on the pixel shift photography relational data (the pixel shift evaluation value and the reliability data) of the last several times stored in the memory group 32. This is because a case is taken into account, where it cannot be said as a failure of the pixel shift unit 20, but the pixel shift is not performed normally.

As a result of this judgment, when it is judged that a change of the adjustment value is not necessary, control proceeds to step S16, and when it is judged that a change of the adjustment value is necessary, control proceeds to step S15.

In step S15, the system controller 30 calculates a new adjustment value based on the pixel shift evaluation value of the last several times, which is stored in the memory group 32, and changes the adjustment value stored in the memory group 32 to the calculated new adjustment value, and control proceeds to step S16.

In step S16, the first photographing is performed, and the image data is stored in the memory group 32. The system controller 30 then outputs the adjustment value stored in the memory group 32 to the pixel shift drive circuit 6 to drive the pixel shift unit 20 via the pixel shift drive circuit 6, to thereby shift the image sensing device by one pixel in the longitudinal direction (pixel shift) (step S17). In a state with the image sensing device shifted by one pixel in the longitudinal direction, the second photographing is performed, and the image data is stored in the memory group 32 (step S18). The image processing section 33 combines the first image data and the second image data stored in the memory group 32, to thereby generate the image data having a high resolution (step S19). After completion of the pixel shift photography, the pixel shift evaluation value and reliability calculating section 34 calculates the pixel shift evaluation value and the reliability data of the image data, for each operation area in the image frame (see FIG. 12), based on the first image data and the second image data (image data before and after the pixel shift) stored in the memory group 32 (step S20), and outputs these data to the system controller 30. The system controller 30 judges whether the pixel shift photography has been normally performed or not based on the pixel shift evaluation value and the reliability data of the image data calculated by the pixel shift evaluation value and reliability calculating section pixel shift evaluation value and reliability calculating section 34 (step S21). Thereafter, the system controller 30 displays the judgment result of the pixel shift photography on the display screen in the camera display section 7 (step S22). The display example of the judgment result is similar to the figure.

The self calibration function of the above adjustment value (the above step S15) will now be described. As the method of calculating the adjustment value, there are two methods, (1) a method of calculating the adjustment value based on the data relating to the amount of shift, and (2) a method of calculating the adjustment value based on the coincidence degree. Which of (1) the amount of shift of the image and (2) the coincidence degree of the image is to be used may be fixed by the concept of the camera, depending on which is given priority, the processing speed or the accuracy, or may be chosen by a user using a button in the camera operation section 8. In either case, it is necessary to store the adjustment value used at the time of performing the pixel shift photography for each time in the camera.

(1) Method of Calculating the Adjustment Value Based on the Data Relating to the Amount of Shift In the ROM of the system controller 30, there is stored an adjustment value—amount of shift table in which relational data indicating the relation (inclination) between the adjustment value and the amount of shift is stored. When judging that the amount of shift of the pixel shift photography of the last time is not within the allowable range, the system controller 30 calculates a new adjustment value based on the pixel shift photography relational data (the amount of shift, the reliability data, etc.) of the last time stored in the memory group 32, referring to the adjustment value—amount of shift table in the ROM.

Since there can be considered that the relation between the adjustment value and the amount of shift may include a mechanical difference, the accuracy of the calculated new adjustment value may be slightly rough. However, by repeating the same thing, the adjustment value will be settled to an optimum adjustment value. Repeating is important. Therefore, if it is made easy to repeat self calibration, such that after self calibration is once performed by problem judgment, problem judgment is performed under lighter conditions than before, then the adjustment value will be settled earlier.

(2) Method of Calculating the Adjustment Value Based on the Coincidence Degree

In the ROM of the system controller 30, there is stored an adjustment value—coincidence degree table (see FIG. 25) in which relational data indicating the relation (inclination) between the adjustment value and the coincidence degree is stored. When judging that the coincidence degree of the pixel shift photography of the last time is not within the allowable range, the system controller 30 calculates a new adjustment value based on the pixel shift photography relational data (the coincidence degree, the reliability data, etc.) of the last time stored in the memory group 32, referring to the adjustment value—coincidence degree table in the ROM.

Whether the adjustment value is to be increased or decreased cannot be judged from these information. Therefore, there can be considered a method in which it is set to be increased (or decreased) always, overlooking a slight sacrifice, and when it is judged that "it should be decreased (increased)", by referring to the next photographing result, the setting is readjusted.

In view of the nature of the mechanism in the pixel shift unit 20, if there is a tendency that an abnormality is likely to occur (for example, there is a general tendency such that the pixel amount of shift gradually increases with the lapse of time), it is desired that increase or decrease is matched to the tendency. This method has a disadvantage in that there is a possibility that the image quality may further decrease temporarily than before, but also has an advantage in that the operation can be performed faster than the amount of shift calculation method. In this case, it is considered that the accuracy of the new adjustment value may be considerably rough than in the amount of shift calculation method, but by repeating the similar thing, it is possible that the adjustment value is settled to the optimum adjustment value. Repeating is important. Therefore, if it is made easy to repeat self calibration, such that after self calibration is once performed by problem judgment, problem judgment is performed under lighter conditions than before, then the adjustment value will be settled earlier.

The self calibration function is for automatically correcting the adjustment value, and hence can create the best pixel shifted image all the time, but there is a problem in that when the use environment is temporarily changed, how it is to be dealt with. For example, there can be mentioned a case of "temperature characteristic". In the case where a camera normally used in a normal temperature is suddenly to be used in a cold place, due to the temperature characteristic of the pixel shift mechanism, there is a possibility that the amount of shift of the pixel may not be optimum. If the above-described self calibration is performed at this time, on the contrary, adequate amount of shift of the pixel cannot be obtained when the use environment returns to the normal temperature, and normal pixel shift photography may not be performed. Therefore, in the case where an abrupt temperature change may exist, the camera operation section 8 is operated to return the adjustment value to the default value or the value before the adjustment, thereby such a problem can be solved.

Moreover, in the case of such an environment change, by reducing the frequency of pixel shift photography used for the judgment for self calibration (for example, up to two to three times), self calibration starts earlier, and as a result, photographing error can be reduced.

On the other hand, in the case where the camera is used continuously in a stable environment, if calibration is performed too frequently, disturbance by the movement of hands may be picked up. Therefore, it is considered that the necessary number of times is about five. Then, it is desirable that the photographer can properly change the number of data used for the pixel shift problem judgment. In this case, a method of inputting the frequency itself may be considered. However, selection from about three stages will be sufficient.

According to the digital camera in this embodiment, since it is considered that proper calibration is possible after shipment, the adjustment accuracy in the factory can be made rough, thereby enabling simplification of the adjustment step. Because, in the case of a conventional camera of a type that cannot be calibrated after shipment, adjustment accuracy close to zero is required, taking into account a change with the lapse of time and a fluctuation portion due to the temperature characteristic.

As described above, according to the second embodiment, the system controller 30 judges whether the pixel shift unit 20 has a failure or not, based on the pixel shift photography relational data obtained by performing the pixel shift photography for several times. Therefore, when an abnormal situation occurs in the pixel shift photography, it is possible to judge whether it is temporary or permanent (=failure). As a result, it becomes possible to judge a failure of the pixel shift unit 20.

According to the second aspect, the system controller 30 judges whether the pixel shift unit 20 has a failure or not, based on the amount of shift obtained by performing the pixel shift photography for several times, thereby enabling judgment of a failure of the pixel shift unit 20 accurately.

According to the second aspect, the pixel shift evaluation value and reliability calculating section 34 calculates the pixel shift evaluation value (the amount of shift or the coincidence degree) for each operation area of the image frame. As a result, it can be detected whether the pixel shift evaluation value (the amount of shift or the coincidence degree) is adequate or not in a plurality of points in the image, thereby enabling accurate judgment with regard to the shift degree of the whole image.

According to the second aspect, the pixel shift evaluation value and reliability calculating section 34 also calculates the reliability data for evaluating the reliability of the calculated pixel shift evaluation value (the amount of shift and the coincidence degree), and the system controller 30 takes the reliability data into account at the time of judgment of the pixel shift photography to thereby calculate the reliability data based on the amount of shift in each operation area. As a result, at the time of judgment of a failure of the pixel shift unit 20, noise can be made minimum, thereby enabling judgment of a failure of the pixel shift unit 20 accurately.

According to the second embodiment, this reliability data is calculated based on the contrast information of a subject (an image), hence the pixel shift evaluation value in the operation area having a low contrast and hence having a large probability of an error can be taken into account. As a result, a failure of the pixel shift unit 20 can be judged highly accurately.

According to the second embodiment, when judging that the pixel shift unit 20 has a failure, the system controller 30 displays that the pixel shift unit 20 has a failure in the camera display section 7. As a result, the photographer can take suitable measures (suspension of use of the pixel shift mode, making a service call, etc.).

According to the second embodiment, when there is a slight failure in the pixel shift mechanism, the adjustment value for the pixel shift drive can be automatically changed (=self calibration), hence it becomes possible to return to the normal condition. As a result, a slight failure can be restored without making a service call, thereby enabling a reduction of unsuccessful pixel shift photography as low as possible.

According to the second embodiment, the camera operation section 8 is operated to enable resetting of the adjustment value to the default value, hence adequate pixel shift can be performed even at the time of a temporary use (for example, use at a low temperature temporarily), and in the normal condition, the adjustment value is returned to the original adjustment value to perform adequate pixel shift photography.

According to the second embodiment, a user can operate the camera operation section 8 to set the photographing frequency in the pixel shift photography relational data of the past pixel shift photography to be stored in the memory group 32 (photographing frequency for self calibration). Hence, when the photographer decides to use the camera in a special environment temporarily, the photographing frequency for calibration can be set to a smaller value, to perform self calibration within a short period of time intentionally. Specifically, if the photographer sets the photographing frequency for self calibration (photographing frequency in the pixel shift photography relational data to be stored in the memory group 32) to 1 to 2 times, when the photographing environment changes from the previous condition (for example, in the case where the photographer goes out to the ski field from the room, or where photographing is started from a moving train), the self calibration mode works immediately, and adequate pixel shift photography becomes possible from the second to the third shots. That is to say, when the photographing environment changes, if the photographing frequency for self calibration is set to a large value, the pixel shift evaluation value at the time of performing the pixel shift photography in the previous environment affects largely at the time of calculating the adjustment value. Therefore, in order to calculate the adjustment value corresponding to the new environment, it is necessary to perform pixel shift photography many times. Hence, when the environment changes, it is desired to set the photographing frequency for self calibration to a small value.

In the self calibration mode, a shift in the direction to be calibrated (in the longitudinal direction) is naturally necessary, but a shift in the lateral direction is hardly useful for calibration. Therefore, the pixel shift evaluation value and reliability calculating section 34 may ignore the lateral direction (the direction which is not moved naturally), and calculate only the longitudinal direction, in order to reduce the calculation time.

In order to reduce the data storage amount of the memory group 32, the pixel shift evaluation value may be corrected based on the reliability data, and the corrected pixel shift evaluation value may be stored in the memory group 32.

A digital camera according to the third embodiment will now be described, with reference to FIG. 19 to FIG. 25. The digital camera in the third embodiment comprises a self calibration mode for adjusting the adjustment value for driving the pixel shift unit 20, and the self calibration mode is executed in response to the instruction of a photographer.

The digital camera in the third embodiment has a construction that is similar to that of the digital camera in the first embodiment (see FIG. 1), and hence only the different point between these will be described here.

The camera operation section 8 comprises a self calibration mode selection button for selecting the self calibration mode. When this self calibration mode selection button is pushed, the system controller 30 executes the self calibration mode. As the key operation for selecting the self calibration mode, any form may be used. For example, the self calibration mode may be selected from the operation menu. Alternatively, since the self calibration mode is a mode having a low use frequency, the self calibration mode may be executed when a plurality of buttons is pushed at the same time. Further, the self calibration mode may be executed, when after the self calibration mode selection button has been pushed, another key (release button and etc.) is operated.

When the self calibration mode selection button in the camera operation section 8 is pushed thereby to input an instruction to start the self calibration mode from the camera operation section 8, the system controller 30 executes the self calibration mode and re-calculates an adjustment value for driving the pixel shift unit 20 and sets the calculated adjustment value (see FIG. 19). In this manner, in the self calibration mode, similar processing is performed to that for the adjustment (setting) of the adjustment value of the pixel shift unit 20 performed in a manufacturing plant. However, differing from the adjustment in the manufacturing plant, since the self calibration mode has to be processed in the camera, it is required that the calibration time is short and the operation is easy. On the other hand, it is desired that the adjustment accuracy is as high as possible. However, since the photographer can execute the self calibration mode frequently depending on the environment, a slight adjustment error is allowable.

The operation of the pixel shift photography of the digital camera according to the third embodiment will now be described with reference to the flowchart in FIG. 19. FIG. 19 shows a flowchart for explaining the operation of the pixel shift photography.

The system controller 30 shown in FIG. 19 judges if an instruction to start the self calibration mode is input from the camera operation section 8 or not (step S31), and if the instruction to start the self calibration mode has not been input, control proceeds to step S35. On the other hand, if the instruction to start the self calibration mode has been input, the system controller 30 executes the self calibration mode to calculate the adjustment value (step S32). The specific method of calculating the adjustment value will be described later.

The system controller 30 then judges if the calculated adjustment value is within a predetermined range or not (step S33), and if the adjustment value is within the predetermined range, control proceeds to step S35. On the other hand, if the adjustment value is without the predetermined range, it is judged whether it is due to a failure of the pixel shift unit 20 or not. As a result of this judgment, if it is not because of a failure of the pixel shift unit 20, control proceeds to step S35. On the other hand, if it is judged that the pixel shift unit 20 has a failure, control proceeds to step S43, and the system controller 30 displays that the pixel shift unit 20 has a failure in the camera display section 7.

In step S35, it is judged if there is an instruction to start the pixel shift photography from the camera operation section 8 or not. If an instruction to start the pixel shift photography is received, control returns to step S31. If an instruction to start the pixel shift photography is not received, control proceeds to step S36.

In step S36, the first photographing is performed and the image data is stored in the memory group 32. The system controller 30 then outputs the adjustment value to the pixel shift drive circuit 6, to drive the pixel shift unit 20 via the pixel shift drive circuit 6, to thereby shift the image sensing device by one pixel in the longitudinal direction (pixel shift) (step S37). In a state with the image sensing device shifted by one pixel in the longitudinal direction, the second photographing is performed, and the image data is stored in the memory group 32 (step S38). The image processing section 33 combines the first image data and the second image data stored in the memory group 32 to generate the image data having a high resolution (step S39). After completion of the pixel shift photography, the pixel shift evaluation value and reliability calculating section 34 calculates the pixel shift evaluation value and the reliability data of the image data, for each operation area (see FIG. 12) of the image data, based on the first image data and the second image data (image data before and after the pixel shift) stored in the memory group 32 (step S40), and outputs the pixel shift evaluation value and the reliability data to the system controller 30. The system controller 30 judges whether the pixel shift photography has been performed normally, based on the pixel shift evaluation value and the reliability data of the image data calculated by the pixel shift evaluation value and reliability calculating section 34 (step S41). Thereafter, the system controller 30 displays the judgment result of the pixel shift photography on the display screen in the camera display section 7 (step S42).

The method of calculating the adjustment value in the self calibration mode in the above step S32 will now be described in detail with reference to FIG. 20A to FIG. 25. As the method of calculating the adjustment value, there are two methods, (1) a method of calculating the adjustment value based on the amount of shift data, and (2) a method of calculating the adjustment value based on the coincidence degree. Which of (1) the amount of shift of the image and (2) the coincidence degree of the image is to be used as the pixel shift evaluation value may be fixed by the concept of the camera, depending on which is given priority, the processing speed or the accuracy, or may be chosen by a user using a button in the camera operation section 8.

Figure 20A:
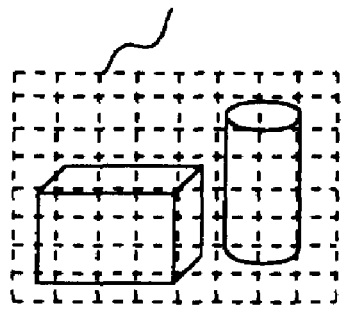
FIG. 20A and FIG. 20B are diagrams for explaining a method of calculating an adjustment value in the self calibration mode.
Figure 20B:
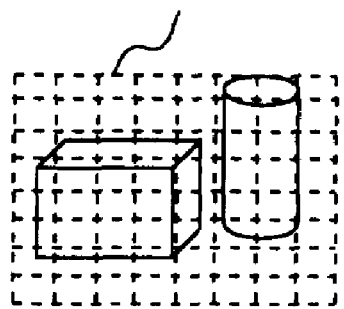

(1) Method of Calculating the Adjustment Value Based on the Coincidence Degree:

The method of calculating the adjustment value based on the coincidence degree will be described with reference to FIG. 20A to FIG. 22. At first, the pixel shift evaluation value and reliability calculating section 34 sets a target image. Specifically, the pixel shift evaluation value and reliability calculating section 34 calculates, as the target image, an image obtained by shifting a photographed image 1 photographed without shifting the image sensing device, as shown in FIG. 20A, by one pixel in the longitudinal direction on the operation, as shown in FIG. 20B.

The system controller 30 then changes the adjustment value adequately, and shifts the image sensing device by the amount, respectively, corresponding to the plurality of adjustment values, to execute photographing at each position of the image sensing device. The pixel shift evaluation value and reliability calculating section 34 calculates the coincidence degree between each photographed image and the target image. The coincidence degree is calculated by calculating the correlation coefficient using the pattern matching method as described above. FIG. 21A to FIG. 21H are diagrams for explaining the coincidence degree between the photographed image and the target image, when the adjustment value is changed. These figures show the photographed images when the adjustment value is set to be 80, 90, 100, 110, 120, 130, 140 and 150, and an example of the coincidence degree between the above photographed images 2 to 9 and the target image.

Figure 22:
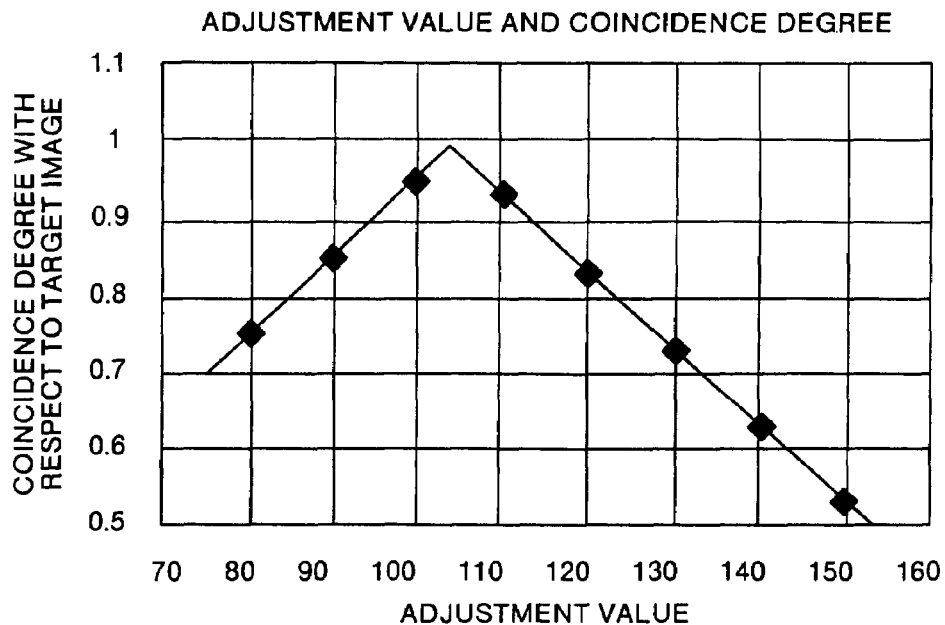
FIG. 22 is a diagram for explaining the method of calculating of an adjustment value in the self calibration mode.

Lastly, the system controller 30 calculates the adjustment value having the largest coincidence degree by the interpolation operation. FIG. 22 is a graph showing the relation between the adjustment value and the coincidence degree with respect to the target image, when the coincidence degree with respect to the target image is calculated by changing the adjustment value (adjustment value=80, 90, 100, 110, 120, 130, 140 and 150). In this figure, the coincidence degree has a peak between the adjustment value of 100 to 110, and the optimum adjustment value becomes 104 by the interpolation operation. According to such a method, a certain photographing frequency is necessary, but the operation itself is relatively simple.

Figure 23:
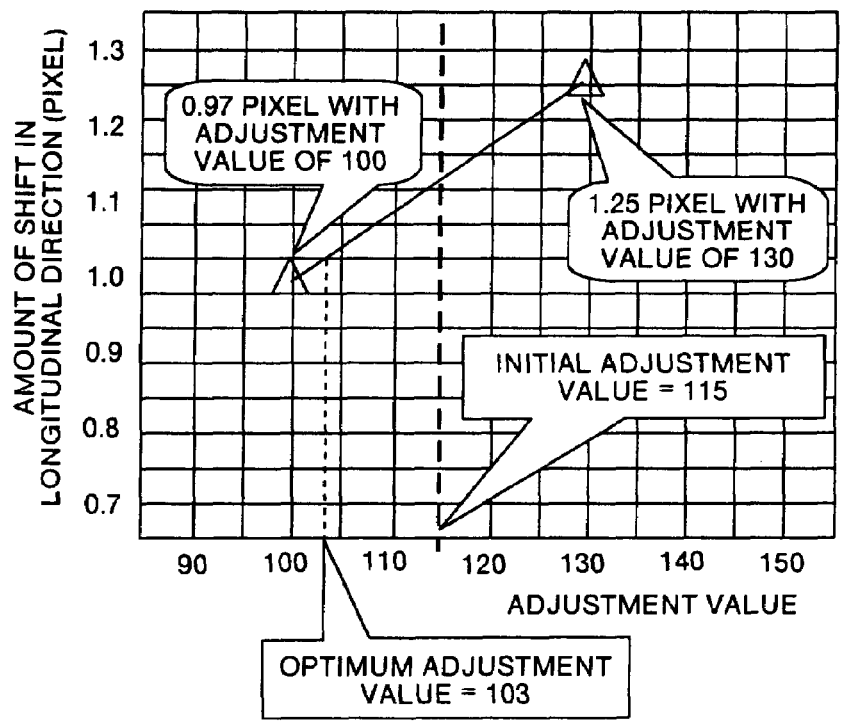
FIG. 23 is a diagram for explaining a method of calculating an optimum adjustment value from adjustment values in two points.
Figure 27A:
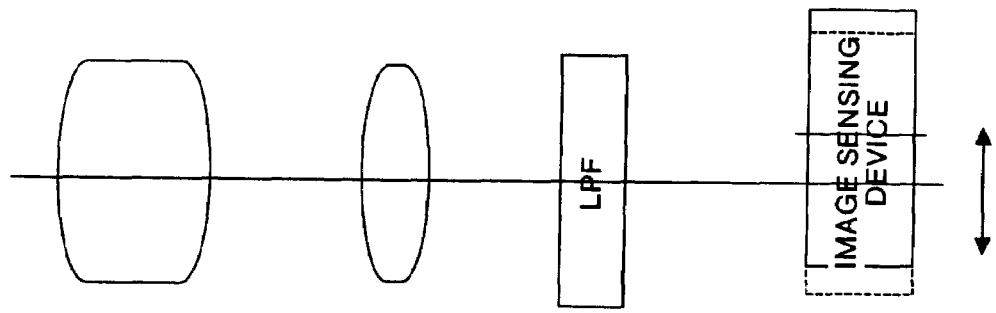
FIG. 27A to FIG. 27C are diagrams for explaining a representative example of a conventional pixel shift mechanism.
Figure 27B:
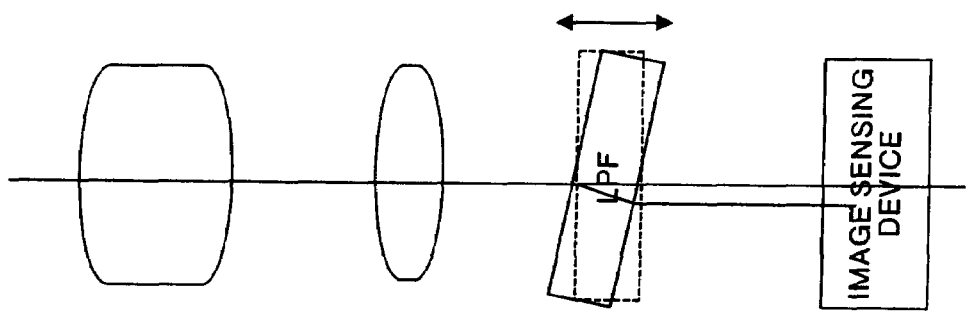
Figure 27C:
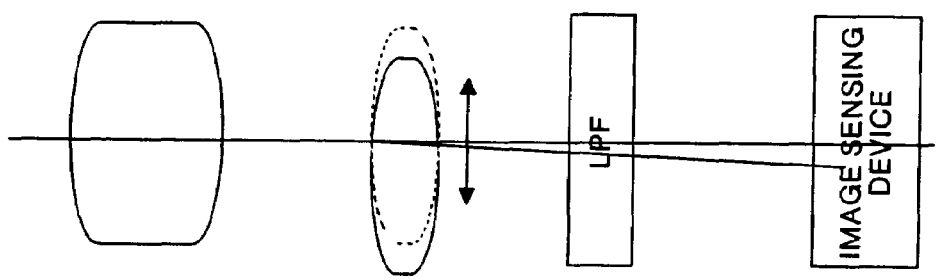

(2) Method of Calculation of the Adjustment Value Based on the Amount of Shift Data:

The method of calculating the optimum adjustment value with the amount of shift calculation method will be described with reference to FIG. 23 to FIG. 25. FIG. 23 is a diagram for explaining the calibration method of the adjustment value using the amount of shift calculation method. In the calibration method that is based on the amount of shift calculation method, the adjustment value having the amount of shift of "1" is counted back.

FIG. 23 and FIG. 24 are diagrams for explaining a case where the optimum adjustment value is calculated from adjustment values at two points. FIG. 23 and FIG. 24 show the relation between the adjustment value and the amount of shift in the longitudinal direction (pixel). FIG. 23 shows a case where the adjustment value is relatively good, and FIG. 24 show a case where the adjustment value deviates largely.

In FIG. 23, the image sensing device is shifted with an adjustment value (100 and 130 in this figure) before and after the previous adjustment value (115 in the example shown in this figure) to photograph each image, the amount of shift is respectively calculated (in the example shown in this figure, the amount of shift is "0.97" when the adjustment value is "100", and the amount of shift is "1.25" when the adjustment value is "130"), and the optimum adjustment value is calculated from these two points by a proportional calculation. Specifically, the amount of shift is calculated in the longitudinal direction, when the adjustment value is 100 and 130, and the adjustment value when the longitudinal amount of shift becomes "1" by the proportional calculation is calculated, to thereby obtain the optimum adjustment value.

FIG. 25 is a diagram for explaining a case where the optimum adjustment value is calculated from an adjustment value at one point, and showing the relation between the adjustment value and the amount of shift in the longitudinal direction (pixel). An inclination line showing the average relation of the adjustment value and the amount of shift is stored in the ROM in the system controller 30, from the amount of shift with the previous adjustment value, and the optimum adjustment value having the amount of shift in the longitudinal direction of "1" is calculated from this inclination line showing the average relation of the adjustment value and the amount of shift.

The method of calculating the optimum adjustment value from an adjustment value at one point has a merit in that the photographing frequency can be decreased, though the accuracy decreases as far as the inclination line and the shift degree exist, compared to the case where the optimum adjustment value is calculated from adjustment values at two points. The accuracy of the optimum adjustment value may be improved by repeating the method of calculating the optimum adjustment value from an adjustment value at one point or the method of calculating the optimum adjustment value from adjustment values at two points.

In order to perform accurate calibration of the adjustment value, a subject most suitable for calibration may be used. Here, the most suitable subject stands for a subject having a certain contrast and adequate brightness, which is not a continuous pattern, and which is in focus. The system controller judges the contrast, continuous pattern, brightness and focus of the image photographed in pre-photographing in the self calibration mode. When it is judged that it is not a subject most suitable for calibration, a warning message such as "Please change the subject" or "It is out of focus" may be displayed in the camera display section 7.

In order to improve the calibration accuracy, a calibration chart recommended by the manufacturer, which is printed beforehand in the operation manual or on an individual package, may be used.

As described above, according to the third embodiment, a self calibration mode is provided for changing the adjustment value for driving the pixel shift unit 20, and when the self calibration mode selection button in the camera operation section 8 is pushed, the self calibration mode is executed. Hence, the photographer can perform calibration of the adjustment value anytime at his discretion, thereby the best pixel shifted image can be obtained always.

According to the third embodiment, in the self calibration mode, the optimum adjustment value is calculated based on the subject image obtained by performing pre-pixel shift photography, and hence accurate calibration of the adjustment value can be performed.

According to the third embodiment, by the pre-pixel shift photography in the self calibration mode, the amount of shift is calculated and the optimum adjustment value is calculated based on the calculated amount of shift. As a result, the photographing frequency required for calibration can be reduced. Specifically, pixel shift photography is performed with two adjustment values before and after the current adjustment value to calculate each amount of shift, and the calculated adjustment value is calculated by a proportional calculation. Hence, a relatively accurate adjustment value can be calculated with a fewer photographing frequency. Moreover, since the pixel shift photography is performed with the current adjustment value, and a new adjustment value is determined by a theoretical calculation based on the capacity data, the adjustment value can be adjusted at high speed.

According to the third embodiment, in the self calibration mode, a plurality of pixel shift photography is performed, while changing the adjustment value, and based on each amount of shift, an adjustment value having a peak amount of shift is calculated as the optimum adjustment value. As a result, though the photographing frequency increases, the peak in the focusing degree can be actually searched, and hence an adjustment value having higher accuracy can be obtained.

According to the third embodiment, since the pixel shift evaluation value and reliability calculating section 34 calculates the pixel shift evaluation value (the amount of shift or the coincidence degree) for each operation area in the image frame, it can be detected whether the pixel shift evaluation value (the amount of shift or the coincidence degree) in a plurality of points in the image is adequate or not. As a result, a precise adjustment value can be obtained with regard to the shift degree (coincidence degree) of the whole image.

According to the third embodiment, since the reliability data is calculated based on the contrast information of the subject (image), the pixel shift evaluation value in the operation area having a low contrast, and hence having a large probability of an error can be taken into account, thereby enabling more accurate judgment of a failure of the pixel shift unit 20.

According to the third embodiment, the system controller 30 judges the contrast, continuous pattern, brightness and focus of the image photographed in pre-photographing in the self calibration mode. When it is judged that it is not a subject most suitable for calibration, a message prompting a change of the subject is displayed in the camera display section 7. Hence, it can be informed to the photographer that this subject cannot be used for calibration, and an inadequate calibration can be prevented from being performed, thereby enabling prevention of unsuccessful pixel shift photography.

According to the third embodiment, when the optimum adjustment value calculated in the self calibration mode is without an allowable range, it is judged to be a failure of the pixel shift unit 20 (a failure that cannot be restored by readjustment), hence pixel shift photography can be prevented from being performed in an adequate condition. As a result, the photographer can take suitable measures (suspension of use of the pixel shift mode, making a service call, etc.).

A digital camera according to the fourth embodiment will now be described with reference to FIG. 26. The digital camera in the fourth embodiment has a normal pixel shift photography mode for performing normal pixel shift photography, and a continuous pixel shift photography mode in which when pixel shift photography is performed, pre-pixel shift photography is first performed, to calculate an adjustment value for driving the pixel shift unit 20, and pixel shift photography is performed based on the calculated adjustment value.

The digital camera according to the fourth embodiment has a construction that is similar to that of the digital camera in the first embodiment (see FIG. 1), and hence only the different point between these will be described here. The camera operation section 8 selects a normal pixel shift photography mode or a continuous pixel shift mode by a mode selection button thereby to output an instruction to start each mode to the system controller 30. The camera operation section 8 also can set the upper limit of the frequency (a predetermined number of times A) for executing the pre-pixel shift photography in the continuous pixel shift mode.

The pixel shift photography operation of the digital camera according to the fourth embodiment will now be described with reference to FIG. 26. FIG. 26 shows a flowchart for explaining the pixel shift photography operation.

In FIG. 26, the camera operation section 8 judges whether an instruction to start the normal pixel shift photography mode is input or not (step S51). If an instruction to start the normal pixel shift photography mode is input, control proceeds to step S52, to thereby execute the normal pixel shift photography mode. On the other hand, in step S51. If an instruction to start the normal pixel shift photography mode is not input, control proceeds to step S59. In step S59, it is judged whether an instruction to start a continuous pixel shift photography is input or not. If an instruction to start the continuous pixel shift photography is input, control proceeds to step S60, to thereby execute the continuous pixel shift photography mode. On the other hand, in step S59, if an instruction to start the continuous pixel shift photography is not input, control returns to step S51.

The operation of the normal pixel shift photography mode in step S52 to step S58 will now be described. The photographing operation of this normal pixel shift photography mode is similar to that of the pixel shift photography in the first embodiment.

At first, the first photographing is performed and the image data is stored in the memory group 32 (step S52). Then, the system controller 30 outputs an adjustment value for shifting the image sensing device by one pixel in the longitudinal direction to the pixel shift drive circuit 6, to thereby drive the pixel shift unit 20 via the pixel shift drive circuit 6, so that the image sensing device is shifted (pixel shift) by one pixel in the longitudinal direction (step S53). The second photographing is performed, with the image sensing device shifted by one pixel in the longitudinal direction, and the image data is stored in the memory group 32 (step S54). The image processing section 33 generates the image data having a high resolution, by combining the first image data and the second image data stored in the memory group 32 (step S55). After completion of the pixel shift photography, the pixel shift evaluation value and reliability calculating section 34 calculates the pixel shift evaluation value and the reliability data of the image data, for each operation area in the image frame (see FIG. 12), based on the first image data and the second image data (image data before and after the pixel shift) stored in the memory group 32 (step S56), and output the pixel shift evaluation value and the reliability data to the system controller 30. The system controller 30 judges whether the pixel shift photography has been performed normally, based on the pixel shift evaluation value and the reliability data of the image data calculated by the pixel shift evaluation value and reliability calculating section 34 (step S57). Thereafter, the system controller 30 displays the judgment result of the pixel shift photography on the display screen in the camera display section 7 (step S58).

The operation of the continuous pixel shift photography mode in step S60 to step S74 will now be described. At first, the system controller 30 sets the value of a pre-pixel shift photography frequency counter N to "0" (step S60). Then, the first photographing is performed and the image data is stored in the memory group 32. The system controller 30 then outputs an adjustment value for shifting the image sensing device by one pixel in the longitudinal direction to the pixel shift drive circuit 6, to drive the pixel shift unit 20 via the pixel shift drive circuit 6 to thereby shift the image sensing device by one pixel in the longitudinal direction (pixel shift) (step S61). Then, the second photographing is performed, with the image sensing device shifted by one pixel in the longitudinal direction, and the image data is stored in the memory group 32 (step S62).

The pixel shift evaluation value and reliability calculating section 34 calculates the pixel shift evaluation value and the reliability data of the image data, for each operation area in the image frame (see FIG. 12), based on the first image data and the second image data (image data before and after the pixel shift) stored in the memory group 32 (step S63), and output the pixel shift evaluation value and the reliability data to the system controller 30.

The system controller 30 increments the value of the pre-pixel shift photography frequency counter N to "1" (step S64). Then, the system controller 30 judges whether the pixel shift evaluation value is within a predetermined range or not (step S65). As a result of this judgment, if the pixel shift evaluation value is without the predetermined range, control proceeds to step S66. On the other hand, if the pixel shift evaluation value is within the predetermined range, control proceeds to step S68.

In step S66, the system controller 30 calculates the adjustment value (step S64) based on the pixel shift evaluation value and the reliability data of the image data calculated by the pixel shift evaluation value and reliability calculating section 34, and changes the adjustment value stored in the memory group 32 to the new adjustment value, and control proceeds to step S67.

In step S67, the system controller 30 judges if the value of the pre-pixel shift photography frequency counter N exceeds the predetermined number of times A (for example, the predetermined number of times A=4 to 5) or not. As a result of this judgment, if the value of the pre-pixel shift photography frequency counter N is smaller than the predetermined number of times A, control returns to step S61, to execute the pre-pixel shift photography (step S61 to step S65). At this time, as the adjustment value set in the pixel shift drive circuit 6, the value calculated in step S64 is used. On the other hand, in step S67, if the value of the pre-pixel shift photography frequency counter N exceeds the predetermined number of times A, control proceeds to step S68.

In this manner, the pre-pixel shift photography is completed, when the pixel shift evaluation value becomes within the predetermined range, or when the pre-pixel shift photography has been performed for the predetermined number of times A.

In the processing after step S67, the main pixel shift photography is performed. A first photographing is first performed to store the image data in the memory group 32 (step S68). The system controller 30 then sets the newest adjustment value calculated in the above pre-pixel shift photography in the pixel shift drive circuit 6, to drive the pixel shift unit 20 via the pixel shift drive circuit 6, to thereby shift the image sensing device by one pixel in the longitudinal direction (pixel shift) (step S69).

Then, the second photographing is performed, with the image sensing device shifted by one pixel in the longitudinal direction, and the image data is stored in the memory group 32 (step S70). The image processing section 33 generates the image data having a high resolution, by combining the first image data and the second image data stored in the memory group 32 (step S71). After completion of the pixel shift photography, the pixel shift evaluation value and reliability calculating section 34 calculates the pixel shift evaluation value and the reliability data of the image data, based on the first image data and the second image data (image data before and after the pixel shift) stored in the memory group 32 (step S72), and output the pixel shift evaluation value and the reliability data to the system controller 30. The system controller 30 judges whether the pixel shift photography has been performed normally, based on the pixel shift evaluation value and the reliability data of the image data calculated by the pixel shift evaluation value and reliability calculating section 34 (step S73). Thereafter, the system controller 30 displays the judgment result of the pixel shift photography on the display screen in the camera display section 7 (step S74).

In the above flowchart, the method of calculating the pixel shift evaluation value and the reliability data, and the method of calculating the optimum adjustment value based on these are the same as those in the second embodiment, and hence the description thereof is omitted.

In the above flowchart, after the adjustment value is set by the pre-pixel shift photography, the main pixel shift photography is performed again, but a method in which photographing is simply completed at the stage where the pixel shift evaluation value becomes OK and the last image is recorded may be adopted.

Moreover, though not shown in the above-mentioned flow-chart, the system controller 30 may judge that the pixel shift unit 20 has a failure, when the calculated adjustment value has exceeded the predetermined number of times or the predetermined range, in the pre-pixel shift photography in the continuous pixel shift photography mode, and display that the pixel shift unit 20 has a failure in the camera display section to thereby inform the photographer of this situation, and stop the execution operation of the continuous pixel shift photography mode.

In the continuous pixel shift photography mode, a combined image and the above-described amount of shift are generated for each pixel shift photography in the pre-pixel shift photography and the main pixel shift photography, and the system controller 30 may store in a storage medium (not shown) only a combined image having the smallest amount of shift, of these combined images.

In the continuous pixel shift photography mode, a plurality of pixel shift photography is performed, while increasing or decreasing the adjustment value stored in the memory group 32 by a predetermined amount, to calculate the combined image and the above-described amount of shift for each pixel shift photography, and the system controller 30 may store in a storage medium (not shown) only a combined image having the smallest amount of shift, of these combined images.

The optimum adjustment value calculated in the continuous pixel shift mode is stored in the memory group 32, and this optimum adjustment value is used also in the normal pixel shift mode. Hence, also in the normal pixel shift photography, it becomes possible to shift the image sensing device with the optimum adjustment value.

As a result, for example, in the case where pixel shift photography is performed frequently under the same conditions, the continuous pixel shift mode is first executed, to set the optimum adjustment value, and at the second time or after, the normal pixel shift mode can be selected to thereby reduce the photographing time.

As described above, according to the fourth embodiment, when the continuous pixel shift mode is selected, the pre-pixel shift photography is first executed, to calculate a new adjustment value based on the calculated pixel shift evaluation value. Then the pre-pixel shift photography is performed again with the calculated new adjustment value. This operation is repetitively executed, and the main pixel shift photography is executed based on the final adjustment value. As a result, the image sensing device can be shifted with the optimum adjustment value, and the image sensing unit can be displaced by a desired amount, thereby high quality image can be obtained.

According to the fourth embodiment, the amount of shift is calculated by the pre-pixel shift photography in the continuous pixel shift mode, and the optimum adjustment value is calculated based on the calculated amount of shift. As a result, an accurate and optimum adjustment value can be calculated.

According to the fourth embodiment, the pixel shift evaluation value and reliability calculating section 34 calculates the pixel shift evaluation value (the amount of shift or the coincidence degree) for each operation area in the image frame. As a result, it can be detected whether the pixel shift evaluation value (the amount of shift or the coincidence degree) is adequate or not in a plurality of points in the image, and a precise adjustment value can be obtained with regard to the shift degree of the whole image.

According to the fourth embodiment, the pixel shift evaluation value and reliability calculating section 34 calculates the pixel shift evaluation value (the amount of shift or the coincidence degree) for each operation area in the image frame. As a result, it can be detected whether the pixel shift evaluation value (the amount of shift or the coincidence degree) is adequate or not in a plurality of points in the image, and a precise adjustment value can be obtained with regard to the shift degree of the whole image.

According to the fourth embodiment, the reliability data is calculated based on the contrast information of a subject (image), and the pixel shift evaluation value in the operation area of an image having a low contrast and hence having a large probability of an error can be taken into account, thereby enabling highly accurate calculation of the adjustment value.

According to the fourth embodiment, the system controller 30, using the pixel shift photography control unit executes the above-described pre-pixel shift photography repetitively for a predetermined number of times, or until the pixel shift evaluation value becomes within a predetermined range. Hence, an image having a sufficient effect of pixel shift can be generally obtained, and such a situation that a camera does not stop can be avoided.

According to the fourth embodiment, the system controller 30 judges that the pixel shift mechanism has a failure, when a calculated new adjustment value exceeds a predetermined number of times or a predetermined range, in the pre-pixel shift photography, displays this matter in the camera display section 7 for informing the photographer. As a result, pixel shift photography is not performed in an inadequate condition, and the photographer can be prompted to make a service call.

According to the fourth embodiment, in the pre-pixel shift photography and the main pre-pixel shift photography, only a combined image having the smallest amount is stored in the recording medium. As a result, the memory capacity of the recording medium can be reduced, and the best image can be always obtained.

The above described image input method may be such that a program prepared in advance is executed by a personal computer or a computer such as a work station. This program is executed by being read from a recording medium that can be read by a computer such as hard disk, floppy disk, CD-ROM, MO, and DVD. This program can be also distributed via the above recording medium, or via a network such as Internet, as a transmission medium.

As described above, according to the invention of one aspect, the photographic optical system forms an image of the subject in the predetermined position. The image sensing unit images the subject image and outputs image data. The pixel shift mechanism control unit controls the pixel shift mechanism to displace the image sensing unit by a predetermined amount. The image combined unit generates image data for one image by combining image data for the plurality of images output before and after the displacement of the image sensing unit. The judgment unit judges whether the pixel shift photography has been normally performed or not, based on the image data for a plurality of images output before and after the displacement of the image sensing unit. As a result, a failure of pixel shift photography caused by movement of hands, movement of the subject, or a failure of the pixel shift mechanism can be informed to a photographer, thereby a pixel shifted image desired by the photographer can be obtained by re-photographing or the like.

Moreover, the pixel shift evaluation value calculation unit calculates a pixel shift evaluation value for judging whether the pixel shift photography has been normally performed or not, based on the image data for a plurality of images output before and after the displacement of the image sensing unit, and the pixel shift photography judgment unit judges whether the pixel shift photography has been normally performed or not, based on the pixel shift evaluation value calculated by the pixel shift evaluation value calculation unit. As a result, in addition to the effect according to the first aspect, it becomes possible to judge if the pixel shift photography is successful or not with a simple method.

Furthermore, the pixel shift evaluation value calculation unit calculates an amount of shift between the image data for the plurality of images output before and after the displacement of the image sensing unit by the predetermined amount, as the pixel shift evaluation value, and the pixel shift photography judgment unit judges whether the pixel shift photography has been performed normally, based on the amount of shift calculated by the pixel shift evaluation value calculation unit. As a result, in addition to the effect according to the second aspect, it becomes possible to judge if the pixel shift photography is successful or not more accurately.

Moreover, the pixel shift evaluation value calculation unit calculates each coincidence degree for a plurality of areas of the image data, when calculating the coincidence degree between the image data for the plurality of images. As a result, in addition to the effect of the invention according to the third aspect, it becomes possible to detect if the coincidence degree is adequate or not in a plurality of points in the image, thereby enabling accurate judgment about the shift degree of the whole image.

Furthermore, the pixel shift photography judgment unit judges that the pixel shift photography has been performed normally when a part of or the whole of the coincidence degree in the plurality of areas calculated by the pixel shift evaluation value calculation unit is within a predetermined range. As a result, in addition to the effect of the invention according to the fourth aspect, it becomes possible to judge unsuccessful pixel shift photography more accurately.

Moreover, the pixel shift photography judgment unit judges that the pixel shift photography has not been performed normally when a part of or the whole of the coincidence degree in the plurality of areas calculated by the pixel shift evaluation value calculation unit is out of the predetermined range, and there is a predetermined relation in the coincidence degree in the plurality of areas. As a result, in addition to the effect of the invention according to the fourth aspect, it becomes possible to judge a failure of the pixel shift photography more accurately.

Furthermore, the pixel shift photography judgment unit judges that the pixel shift photography has been performed normally, but a part of the subject has moved, in the case where a part of or the whole of the coincidence degree in the plurality of areas calculated by the pixel shift evaluation value calculation unit is out of the predetermined range, but there is no predetermined relation in the coincidence degree in the plurality of areas. As a result, in addition to the effect of the invention according to the fourth aspect, it becomes possible to judge a movement of the subject.

Moreover, the reliability evaluation unit calculates reliability data indicating the reliability of each coincidence degree in the plurality of areas calculated by the pixel shift evaluation value calculation unit, and judges whether the pixel shift photography has been performed normally, based on the coincidence degree in the plurality of areas and the reliability data. As a result, in addition to the effect according to either one of the fourth to the seventh aspects, at the time of judgment of the pixel shift photography, the coincidence degree of an operation area having a large influence of noise may not be used, or weighting therefor can be made small, thereby enabling prevention of erroneous judgment of pixel shift photography.

Furthermore, the pixel shift evaluation value calculation unit calculates the coincidence degree between the target image data when the image data output by the image sensing unit before being displaced by the predetermined amount is shifted by the predetermined amount, and the image data output after the displacement of the image sensing unit by the predetermined amount, as the pixel shift evaluation value, and the pixel shift photography judgment unit judges whether the pixel shift photography has been performed normally, based on the coincidence degree calculated by the pixel shift evaluation value calculation unit. As a result, in addition to the effect according to the second aspect, it becomes possible to judge whether the pixel shift photography is successful or not more accurately.

Moreover, the pixel shift evaluation value calculation unit calculates the coincidence degree, respectively, for the plurality of areas of the image data, at the time of calculating the coincidence degree. As a result, in addition to the effect of the invention according to the ninth aspect, it becomes possible to detect whether the coincidence degree is adequate or not in a plurality of points in the image, thereby enabling accurate judgment about the coincidence degree of the whole image.

Furthermore, the pixel shift photography judgment unit judges that the pixel shift photography has been performed normally when a part of or the whole of the coincidence degree in the plurality of areas calculated by the pixel shift evaluation value calculation unit is within a predetermined range. As a result, in addition to the effect of the invention according to the tenth aspect, it becomes possible to judge a failure of the pixel shift photography more accurately.

Moreover, the pixel shift photography judgment unit judges that the pixel shift photography has not been performed normally when a part of or the whole of the coincidence degree of the plurality of areas calculated by the pixel shift evaluation value calculation unit is out of the predetermined range, and there is a predetermined relation in the coincidence degree in the plurality of areas. As a result, in addition to the effect of the invention according to the tenth aspect, it becomes possible to judge a failure of the pixel shift photography more accurately.

Furthermore, the pixel shift photography judgment unit judges that the pixel shift photography has been performed normally, but a part of the subject has moved, in the case where a part of or the whole of the coincidence degree in the plurality of areas calculated by the pixel shift evaluation value calculation unit is out of the predetermined range, but there is no predetermined relation in the coincidence degree in the plurality of areas. As a result, in addition to the effect of the invention according to the tenth aspect, it becomes possible to judge a movement of the subject.

Moreover, the reliability evaluation unit calculates reliability data indicating the reliability of each coincidence degree in the plurality of areas calculated by the pixel shift evaluation value calculation unit, and the pixel shift photography judgment unit judges whether the pixel shift photography has been performed normally, based on the coincidence degree in the plurality of areas and the reliability data. As a result, in addition to the effect of the invention according to either one of the tenth aspect to the thirteenth aspect, at the time of judgment of the pixel shift photography, the coincidence degree of an operation area having a large influence of noise may not be used, or weighting therefor can be made small, thereby enabling prevention of erroneous judgment of pixel shift photography.

Furthermore, the informing unit informs of the judgment result of the pixel shift photography judgment unit. As a result, in addition to the effects of the inventions according to the first aspect to the fourteenth aspect, it can be informed to the photographer that the pixel shift photography has been abnormally performed, so that the photographer can take suitable measures (measures for preventing movement of hands or restricting movement of the subject, making a service call, etc.).

According to the invention of another aspect, the photographic optical system forms an image of a subject in a predetermined position, the image sensing unit images the subject image and outputs image data, the pixel shift mechanism control unit controls the pixel shift mechanism to displace the image sensing unit by a predetermined amount. The image combining unit generates image data for one image by combining image data for the plurality of images output before and after the displacement of the image sensing unit. The pixel shift evaluation value calculation unit calculates a pixel shift evaluation value for judging whether the pixel shift photography has been normally performed or not, based on the image data for a plurality of images output before and after the displacement of the image sensing unit. The storage control unit stores the pixel shift evaluation value calculated by the pixel shift evaluation value calculation unit in a storage unit, and the failure judgment unit judges a failure of the pixel shift mechanism, based on the pixel shift evaluation values obtained by performing the pixel shift photography for several times and stored in the storage unit. As a result, when an abnormal situation occurs in the pixel shift photography, it can be judged whether it is temporary or permanent (=failure), thereby enabling judgment of a failure of the pixel shift mechanism.

Moreover, the pixel shift evaluation value calculation unit calculates a coincidence degree between the image data for the plurality of images output before and after the displacement of the image sensing unit by the predetermined amount, as the pixel shift evaluation value. As a result, in addition to the effect of the invention according to the sixteenth aspect, it becomes possible to judge a failure of the pixel shift mechanism accurately.

Furthermore, the pixel shift evaluation value calculation unit calculates each coincidence degree for a plurality of areas of the image data, when calculating the coincidence degree between the image data for the plurality of images. As a result, in addition to the effect of the invention according to the seventeenth aspect, it becomes possible to detect if the coincidence degree is adequate or not in a plurality of points in the image, thereby enabling accurate judgment about the shift degree of the whole image.

Moreover, the reliability evaluation unit calculates reliability data indicating the reliability of the coincidence degree in the plurality of areas calculated by the pixel shift evaluation value calculation unit, the storage control unit stores the reliability data calculated by the reliability evaluation unit in the storage unit, corresponding to the data of coincidence degree, and the failure judgment unit judges the existence of abnormality in the pixel shift mechanism, based on the pixel shift evaluation values obtained by performing the pixel shift photographing for several times stored in the storage unit and the reliability data. As a result, in addition to the effect of the invention according to the eighteenth aspect, it becomes possible to minimize noise at the time of judging a failure of the pixel shift mechanism, thereby enabling judgment of a failure in the pixel shift mechanism accurately.

Furthermore, the reliability evaluation unit calculates reliability data indicating the reliability of the coincidence degree in the plurality of areas calculated by the pixel shift evaluation value calculation unit, the storage control unit corrects the coincidence degree based on the reliability data calculated by the reliability evaluation unit and stores the corrected coincidence degree in the storage unit, and the failure judgment unit judges the existence of abnormality in the pixel shift mechanism, based on the corrected coincidence degree of the last several times stored in the storage unit. As a result, in addition to the effect of the invention according to the nineteenth aspect, it becomes possible to reduce the data amount stored in the storage unit.

Moreover, the pixel shift evaluation value calculation unit calculates the coincidence degree between the target image data when the image data output by the image sensing unit before being displaced by a predetermined amount is shifted by the predetermined amount, and the image data output after the displacement of the image sensing unit by the predetermined amount, as the pixel shift evaluation value. As a result, in addition to the effect of the invention according to the sixteenth aspect, it becomes possible to judge a failure in the pixel shift mechanism accurately.

Furthermore, the pixel shift evaluation value calculation unit calculates the coincidence degree, respectively, for the plurality of areas of the image data, at the time of calculating the coincidence degree. As a result, in addition to the effect of the invention according to the twenty-first aspect, it becomes possible to detect if the coincidence degree is adequate or not in a plurality of points in the image, thereby enabling accurate judgment about the coincidence degree of the whole image.

Moreover, the reliability evaluation unit calculates reliability data indicating the reliability of the coincidence degree in the plurality of areas calculated by the pixel shift evaluation value calculation unit, the storage control unit stores the reliability data calculated by the reliability evaluation unit in the storage unit, corresponding to the data of coincidence degree, and the failure judgment unit judges the existence of abnormality in the pixel shift mechanism, based on the pixel shift evaluation values of photographing of the last several times stored in the storage unit and the reliability data. As a result, in addition to the effect of the invention according to the twenty-second aspect, it becomes possible to minimize noise at the time of judging a failure in the pixel shift mechanism, thereby enabling judgment of a failure in the pixel shift mechanism accurately.

Furthermore, the reliability evaluation unit calculates reliability data indicating the reliability of the coincidence degree in the plurality of areas calculated by the pixel shift evaluation value calculation unit, the storage control unit corrects the coincidence degree based on the reliability data calculated by the reliability evaluation unit and stores the corrected coincidence degree in the storage unit, and the failure judgment unit judges the existence of abnormality in the pixel shift mechanism, based on the corrected coincidence degree of the last several times stored in the storage unit. As a result, in addition to the effect of the invention according to the twenty-second aspect, it becomes possible to reduce the data amount stored in the storage unit.

Moreover, the pixel shift mechanism failure informing unit informs of a failure in the pixel shift mechanism, when it is judged by the failure judgment unit that the pixel shift mechanism has a failure. As a result, in addition to the effect of the invention according to either one of the sixteenth to twenty-fourth aspects, the photographer can take suitable measures (suspension of use of the pixel shift mode, making a service call, etc.).

Furthermore, the self calibration unit judges whether it is necessary or not to change the adjustment value for driving the pixel shift mechanism, and if it is necessary to change the adjustment value, changes the adjustment value stored in the adjustment value storage unit. As a result, in addition to the effect of the invention according to either one of the sixteenth aspect to the twenty-fifth aspect, at the time of a negligible failure of the pixel shift mechanism, the adjustment value for driving the pixel shift mechanism can be automatically changed, to thereby restore the normal condition.

Moreover, the input unit instructs to change a new adjustment value stored in the adjustment value storage unit to a value before the change or to an initial value by the pixel shift self calibration unit. As a result, in addition to the effect of the invention according to the twenty-sixth aspects, suitable pixel shift photography can be performed depending on the use environment.

Furthermore, the frequency input unit sets the photographing frequency for the historical pixel shift evaluation values stored in the storage unit, and the self calibration unit calculates a new adjustment value, based on the historical pixel shift evaluation values for the number of times of photographing set by the frequency input unit. As a result, in addition to the effect of the invention according to the twenty-sixth aspects, the adjustment time desired by the photographer can be set.

According to the invention of still another aspect, the photographic optical system forms an image of the subject in the predetermined position, the image sensing unit images the subject image and outputs image data, and the pixel shift mechanism control unit controls the pixel shift mechanism based on the adjustment value stored in the adjustment value storage unit to displace the image sensing unit by a predetermined amount. The image combining unit generates image data for one image by combining image data for the plurality of images output before and after the displacement of the image sensing unit. The pixel shift evaluation value calculation unit judges whether the pixel shift photography has been normally performed or not, based on the image data for a plurality of images output before and after the displacement of the image sensing unit. The selection unit selects the pixel shift calibration mode. When the pixel shift calibration mode is selected, the self calibration unit executes pre-pixel shift photography once or plural times, re-calculates the adjustment value based on the pixel shift evaluation value for each pixel shift photography, calculated by the pixel shift evaluation value calculation unit, to thereby calculate a new adjustment value, and changes the adjustment value stored in the adjustment value storage unit to the new adjustment value. As a result, the photographer can perform calibration for the adjustment value, anytime at his discretion, thereby the best pixel shifted image can be always obtained.

Moreover, the pixel shift evaluation value calculation unit calculates a coincidence degree between the image data for the plurality of images output before and after the displacement of the image sensing unit by the predetermined amount, as the pixel shift evaluation value, and the self calibration unit calculates the new adjustment value based on the coincidence degree. As a result, in addition to the effect of the invention according to the twenty-ninth aspect, it becomes possible to calculate an accurate adjustment value.

Furthermore, when the pixel shift calibration mode is selected, the self calibration unit sets an adjustment value larger than the adjustment value stored in the adjustment value storage unit by a predetermined amount and an adjustment value smaller than that by a predetermined amount in the pixel shift mechanism, and performs pixel shift photography twice, to re-calculate the adjustment value based on the coincidence degree between the two pixel shift photography calculated by the pixel shift evaluation value calculation unit to thereby calculate a new adjustment value. As a result, in addition to the effect of the invention according to the thirtieth aspect, a relatively accurate adjustment value can be calculated with a fewer number of times of photographing.

Moreover, when the pixel shift calibration mode is selected, the self calibration unit sets the adjustment value stored in the adjustment value storage unit in the pixel shift mechanism to perform one pixel shift photography, and refers to the relational data between the adjustment value registered in advance and the coincidence degree, based on the coincidence degree calculated by the pixel shift evaluation value calculation unit, to thereby calculate the new adjustment value. As a result, in addition to the effect of the invention according to the thirtieth aspect, the adjustment value can be calculated within a short period of time.

Furthermore, the pixel shift evaluation value calculation unit calculates, as the pixel shift evaluation value, the coincidence degree between a target image data when the image data output by the image sensing unit before being displaced by a predetermined amount is shifted by the predetermined amount, and the image data output after the displacement of the image sensing unit by the predetermined amount, and the self calibration unit calculates the new adjustment value based on the coincidence degree. As a result, in addition to the effect of the invention according to the twenty-ninth aspect, the adjustment value can be accurately calculated.

Moreover, when calculating the amount of shift or the coincidence degree, the pixel shift evaluation value calculation unit calculates the amount of shift or the coincidence degree, respectively, for the plurality of areas of the image data. As a result, in addition to the effect of the invention according to either one of the twenty-ninth to the thirty-third aspects, it becomes possible to detect whether the pixel shift evaluation value (the amount of shift or the coincidence degree) is adequate or not in the plurality of points in the image, thereby more precise adjustment value can be obtained about the shift degree (coincidence degree) of the whole image.

Furthermore, the reliability evaluation unit calculates reliability data indicating the reliability of each coincidence degree or each coincidence degree in the plurality of areas calculated by the pixel shift evaluation value calculation unit, and the self calibration unit calculates the new adjustment value based on the amount of shift or the coincidence degree, and the reliability data. As a result, in addition to the effect of the invention according to the thirty-fourth aspect, it becomes possible to minimize the influence of noise of the image at the time of calculating a new adjustment value, thereby enabling accurate calculation of the adjustment value.

Moreover, the an unacceptable subject informing unit which informs that it is necessary to change the subject or to change the distance of subject, when a part of or the whole of the reliability data calculated by the reliability evaluation unit does not reach a predetermined level. As a result, in addition to the effect of the invention according to the thirty-fifth aspect, it becomes possible to prevent inadequate calibration from being performed, thereby enabling prevention of a failure in the pixel shift photography.

Furthermore, the pixel shift mechanism failure judgment unit judges whether the new adjustment value calculated by the self calibration unit is within a predetermined range or not, and when it is without the predetermined range, judges that the pixel shift mechanism has a failure, and the pixel shift mechanism failure informing unit informs of a failure of the pixel shift mechanism, when it is judged that the pixel shift mechanism has a failure by the pixel shift mechanism failure judgment unit. As a result, in addition to the effect of the invention according to the thirty-sixth aspect, it can be prevented to perform pixel shift photography in an inadequate condition, thereby the photographer can take adequate measures (suspension of use of the pixel shift mode, making a service call, etc.).

According to the invention of still another aspect, the photographic optical system forms an image of the subject in the predetermined position, the image sensing unit images the subject image and outputs image data, and the pixel shift mechanism control unit controls the pixel shift mechanism based on the adjustment value stored in the adjustment value storage unit to displace the image sensing unit by a predetermined amount. The image combining unit generates image data for one image by combining image data for the plurality of images output before and after the displacement of the image sensing unit. The pixel shift evaluation value calculation unit calculates a pixel shift evaluation value for judging whether the pixel shift photography has been normally performed or not, based on the image data for a plurality of images output before and after the displacement of the image sensing unit. The pixel shift photography control unit controls to execute an operation repetitively in which, when a continuous pixel shift mode is selected, a pre-pixel shift photography is executed by setting an adjustment value in the pixel shift mechanism, the pixel shift evaluation value calculation unit calculates the pixel shift evaluation value to thereby calculate a new adjustment value based on the calculated pixel shift evaluation value, and pre-pixel shift photography is performed again with the calculated new adjustment value. As a result, an optimum adjustment value can be calculated, and it becomes possible to drive the pixel shift mechanism based on this optimum adjustment value, and hence high quality image can be obtained.

Moreover, the pixel shift photography control unit determines the final adjustment value based on the adjustment value calculated by the repetitively performed pre-pixel shift photography, and controls so that the final pixel shift photography is executed, based on the final adjustment value. As a result, the final pixel shift photography can be performed with the optimum adjustment value, and hence high quality image can be obtained.

Furthermore, the pixel shift evaluation value calculation unit calculates the coincidence degree between the image data for the plurality of images output before and after the displacement of the image sensing unit by a predetermined amount, as the pixel shift evaluation value, and the pixel shift photography control unit calculates the new adjustment value based on the coincidence degree. As a result, in addition to the effect of the invention according to the thirty-eighth aspect or the thirty-ninth aspect, it becomes possible to calculate the adjustment value more accurately.

Moreover, the pixel shift evaluation value calculation unit calculates the coincidence degree between the target image data when the image data output by the image sensing unit before being displaced by the predetermined amount is shifted by the predetermined amount, and the image data output after the displacement of the image sensing unit by a predetermined amount, as the pixel shift evaluation value; and the pixel shift photography control unit calculates the new adjustment value based on the coincidence degree. As a result, in addition to the effect of the invention according to the thirty-eighth aspect or the thirty-ninth aspect, it becomes possible to calculate the adjustment value more accurately.

Furthermore, the pixel shift evaluation value calculation unit calculates the amount of shift or the coincidence degree, respectively, for a plurality of areas of the image data, when calculating the amount of shift or the coincidence degree. As a result, in addition to the effect of the invention according to the fortieth aspect or the forty-first aspect, it can be detected whether the pixel shift evaluation value calculation unit (the amount of shift or the coincidence degree) is adequate or not in the plurality of points in the image, thereby more precise adjustment value can be obtained with regard to the shift degree (coincidence degree) of the whole image.

Moreover, the reliability evaluation unit calculates reliability data indicating the reliability of each coincidence degree or each coincidence degree in the plurality of areas calculated by the pixel shift evaluation value calculation unit, and the pixel shift photography control unit calculates the new adjustment value, based on the amount of shift or the coincidence degree, and the reliability data. As a result, in addition to the effect of the invention according to the forty-second aspect, it becomes possible to minimize the influence of noise of the image at the time of calculating a new adjustment value, thereby enabling accurate calculation of the adjustment value.

Furthermore, the pixel shift photography control unit repetitively executes the pre-pixel shift photography for a predetermined number of times, or until the pixel shift evaluation value becomes within a predetermined range. As a result, in addition to the effect of the invention according to the thirty-ninth to the forty-third aspects, a high quality image can be obtained, and such a situation that the camera does not stop can be avoided.

Moreover, the pixel shift photography control unit judges that the pixel shift mechanism has a failure, in the case where the calculated new adjustment value exceeds a predetermined number of times or a predetermined range, in the pre-pixel shift photography, and informs of this matter. As a result, in addition to the effect of the invention according to the thirty-ninth to the forty-fourth aspects, pixel shift photography is not performed in an inadequate condition, thereby it becomes possible to urge the photographer to make a service call.

Furthermore, the pixel shift photography control unit stores, in the image storage unit, only the combined image having the best pixel shift evaluation value calculated by the pixel shift evaluation value calculation unit in the pre-pixel shift photography and the main pixel shift photography. As a result, in addition to the effect of the invention according to either one of the thirty-ninth to the forty-fourth aspects, the memory capacity of the recording medium can be reduced, thereby the best image can be always obtained.

Moreover, the mode selection unit selects the normal pixel shift photography mode for generating the combined image by one pixel shift photography and the continuous pixel shift photography mode. As a result, it becomes possible to select a plurality of pixel shift photography modes depending on the preference of the photographer.

Furthermore, the reliability evaluation unit calculates the reliability data based on the contrast of the image within the range of each operation area. As a result, in addition to the effect of the invention according to either one of the above-mentioned aspects, the pixel shift evaluation value in the operation area of an image having a low contrast and hence having a large probability of error can be taken into consideration, and hence a more accurate adjustment value can be calculated.

According to the invention of still another aspect, a subject image is imaged on the image sensing unit to output first image data, the image sensing unit is displaced by a predetermined amount, the subject image is imaged on the image sensing unit displaced by the predetermined amount to output second image data, image data for one image is generated by combining the first image data and the second image data, and it is judged whether the pixel shift photography has been normally performed or not, based on the first image data and the second image data. As a result, a failure of the pixel shift photography caused by the movement of hands, movement of the subject, a problem in the mechanism, or the like can be informed to the photographer, and hence the photographer can obtain a desired pixel shifted image by re-photographing or the like.

According to the invention of still another aspect, a subject image is imaged on the image sensing unit to output first image data, the image sensing unit is displaced by a predetermined amount by the pixel shift mechanism, the subject image is imaged on the image sensing unit displaced by the predetermined amount to output second image data, and image data for one image is generated by combining the first image data and the second image data. The pixel shift evaluation value for judging whether the pixel shift photography has been normally performed or not is calculated based on the first image data and the second image data. The pixel shift evaluation value is stored in the storage unit, and it is judged if there is a failure of the pixel shift mechanism, based on the pixel shift evaluation values obtained by performing the pixel shift photography for several times and stored in said storage unit and stored in the storage unit. As a result, when an abnormal situation occurs in the pixel shift photography, it can be judged whether it is temporary or permanent (=failure), thereby enabling judgment of a failure of the pixel shift mechanism.

According to the invention of still another aspect, a subject image is imaged on the image sensing unit to output first image data, the pixel shift mechanism is driven based on the adjustment value stored in the storage unit to displace the image sensing unit by a predetermined amount, and the subject image is imaged on the image sensing unit displaced by the predetermined amount to output second image data. One image data is generated based on the first image data and the second image data, and when the self calibration mode is selected, pre-pixel shift photography is executed once or plural times, to calculate a pixel shift evaluation value for judging whether the pixel shift photography has been normally performed or not based on the first image data and the second image data. Based on the calculated pixel shift evaluation value, a new adjustment value is calculated by re-calculating the adjustment value, to change the adjustment value stored in the storage unit to the new adjustment value. As a result, the photographer can perform calibration of the adjustment value anytime at his discretion, thereby the best pixel shifted image can be always obtained.

According to the invention of still another aspect, a subject image is imaged on the image sensing unit to output first image data, the pixel shift mechanism is driven based on the adjustment value stored in the storage unit to displace the image sensing unit by a predetermined amount, and the subject image is imaged on the image sensing unit displaced by the predetermined amount to output second image data. The pixel shift evaluation value for judging whether the pixel shift photography has been normally performed or not is calculated based on the first image data and the second image data. A new adjustment value is calculated by re-calculating the adjustment value based on the calculated pixel shift evaluation value, to change the adjustment value stored in the storage unit to the new adjustment value. The above operation is repeated for a predetermined number of times, or until the new adjustment value becomes within a predetermined range, and pixel shift photography is performed with the final adjustment value. As a result, the pixel shift mechanism can be driven with the optimum adjustment value, and hence high quality image can be obtained.

According to the invention of still another aspect, each step of the method according to this invention is realized by executing the computer program, that is stored in a recording medium, by the computer. As a result, even if movement of hands, movement of the subject, performance change of the pixel shift mechanism or the like occurs, it becomes possible to prevent unsuccessful pixel shift photography as much as possible.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image input unit capable of performing pixel shift photography, said image input unit comprising:
    a photographic optical system which forms an image of a subject in a predetermined position;
    an image sensing unit which generates image data corresponding to the image of the subject;
    a pixel shift mechanism which displaces said image sensing unit by a predetermined amount;
    an adjustment value storage unit which stores an adjustment value for driving said pixel shift mechanism;
    a pixel shift mechanism control unit which controls said pixel shift mechanism based on the adjustment value stored in the adjustment value storage unit, to thereby displace said image sensing unit by the predetermined amount;
    an image combining unit which generates a combined image data for one image by combining the image data from a plurality of images output before and after the displacement of said image sensing unit;
    a pixel shift evaluation value calculation unit which calculates a pixel shift evaluation value for judging whether the pixel shift photography on a completed combined image has been performed correctly or not, based on comparing the image data from a plurality of images output before the displacement of said image sensing unit with the image data from the plurality of images output after the displacement of said image sensing unit; and
    a pixel shift photography control unit which controls to execute an operation repetitively in which, when a continuous pixel shift mode is selected, a pre-pixel shift photography of setting an adjustment value in said pixel shift mechanism, said pixel shift evaluation value calculation unit calculates the pixel shift evaluation value to thereby calculate a new adjustment value based on the calculated pixel shift evaluation value, and the pre-pixel shift photography is performed again with the new adjustment value.

2. The image input unit according to claim 1, wherein the pixel shift photography control unit determines a final adjustment value based on the adjustment value calculated by the pre-pixel shift photography repetitively performed, and controls so that a final pixel shift photography is executed, based on the final adjustment value.

3. The image input unit according to claim 1, wherein said pixel shift evaluation value calculation unit calculates the amount of shift between the image data from the plurality of images output before and after the displacement of said image sensing unit, as the pixel shift evaluation value; and
    the pixel shift photography control unit calculates the new adjustment value based on the amount of shift.

4. The image input unit according to claim 1, wherein said pixel shift evaluation value calculation unit calculates a coincidence degree between a target image data when the image data output by said image sensing unit before being displaced is shifted for the predetermined amount, and the image data output after the displacement of said image sensing unit, as the pixel shift evaluation value; and
    the pixel shift photography control unit calculates the new adjustment value based on the coincidence degree.

5. The image input unit according to claim 3, wherein said pixel shift evaluation value calculation unit calculates the amount of shift or a coincidence degree, respectively, for a plurality of areas of the image data, when calculating the amount of shift or the coincidence degree.

6. The image input unit according to claim 4, wherein said pixel shift evaluation value calculation unit calculates the amount of shift or the coincidence degree, respectively, for a plurality of areas of the image data, when calculating the amount of shift or the coincidence degree.

7. The image input unit according to claim 5, further comprising a reliability evaluation unit which calculates reliability data indicating the reliability of each amount of shift or each coincidence degree in the plurality of areas calculated by said pixel shift evaluation value calculation unit;
    the pixel shift photography control unit calculating the new adjustment value, based on the amount of shift or the coincidence degree, and the reliability data.

8. The image input unit according to claim 6, further comprising a reliability evaluation unit which calculates reliability data indicating the reliability of each amount of shift or each coincidence degree in the plurality of areas calculated by said pixel shift evaluation value calculation unit;
    the pixel shift photography control unit calculating the new adjustment value, based on the amount of shift or the coincidence degree, and the reliability data.

9. The image input unit according to claim 2, wherein the pixel shift photography control unit repetitively executes the pre-pixel shift photography for a predetermined number of times, or until the pixel shift evaluation value becomes within a predetermined range.

10. The image input unit according to claim 3, wherein the pixel shift photography control unit repetitively executes the pre-pixel shift photography for a predetermined number of times, or until the pixel shift evaluation value becomes within a predetermined range.

11. The image input unit according to claim 4, wherein the pixel shift photography control unit repetitively executes the pre-pixel shift photography for a predetermined number of times, or until the pixel shift evaluation value becomes within a predetermined range.

12. The image input unit according to claim 2, wherein the pixel shift photography control unit judges that said pixel shift mechanism has a failure, in the case where the calculated new adjustment value exceeds a predetermined number of times or a predetermined range, in the pre-pixel shift photography, and informs of this matter.

13. The image input unit according to claim 3, wherein the pixel shift photography control unit judges that said pixel shift mechanism has a failure, in the case where the calculated new adjustment value exceeds a predetermined number of times or a predetermined range, in the pre-pixel shift photography, and informs of this matter.

14. The image input unit according to claim 4, wherein the pixel shift photography control unit judges that said pixel shift mechanism has a failure, in the case where the calculated new adjustment value exceeds a predetermined number of times or a predetermined range, in the pre-pixel shift photography, and informs of this matter.

15. The image input unit according to claim 2, further comprising an image storage unit which stores a combined image combined by said image combining unit, the pixel shift photography control unit storing only the combined image having the best pixel shift evaluation value calculated by said pixel shift evaluation value calculation unit in the pre-pixel shift photography and a main pixel shift photography, in said image storage unit.

16. The image input unit according to claim 3, further comprising an image storage unit which stores a combined image combined by said image combining unit, the pixel shift photography control unit storing only the combined image having the best pixel shift evaluation value calculated by said pixel shift evaluation value calculation unit in the pre-pixel shift photography and a main pixel shift photography, in said image storage unit.

17. The image input unit according to claim 4, further comprising an image storage unit which stores a combined image combined by said image combining unit, the pixel shift photography control unit storing only the combined image having the best pixel shift evaluation value calculated by said pixel shift evaluation value calculation unit in the pre-pixel shift photography and a main pixel shift photography, in said image storage unit.

18. The image input unit according to claim 1, further comprising a mode selection unit which selects a normal pixel shift photography mode for generating a combined image by one pixel shift photography and the continuous pixel shift mode.

19. The image input unit according to claim 7, wherein said reliability evaluation unit calculates the reliability data based on the contrast of the image within the range of each of calculation areas.

20. The image input unit according to claim 8, wherein said reliability evaluation unit calculates the reliability data based on the contrast of the image within the range of each of calculation areas.

21. An image input method for performing pixel shift photography, comprising:

a first step of acquiring a first image data corresponding to an image of a subject with an image sensing unit;

a second step of displacing said image sensing unit by a predetermined amount by driving a pixel shift mechanism based on an adjustment value stored in a storage unit;

a third step of imaging the image of the subject on said image sensing unit displaced by the predetermined amount to output second image data;

a fourth step of calculating a pixel shift evaluation value for judging whether the pixel shift photography on a completed combined image has been performed correctly or not, based on comparing the first image data output before the displacing of said image sensing unit and the second image data output after the displacing of said image sensing unit;

a fifth step of calculating a new adjustment value by re-calculating the adjustment value, based on the calculated pixel shift evaluation value, and changing the adjustment value stored in said storage unit to the new adjustment value;

a sixth step of repeating said first to fifth steps for a predetermined number of times, or until the new adjustment value becomes within a predetermined range; and a seventh step of performing the pixel shift photography with a final adjustment value.

22. A computer readable medium for storing instructions, which when executed on a computer, causes the computer to perform:

a first step of acquiring a first image data corresponding to an image of a subject with an image sensing unit;

a second step of displacing said image sensing unit by a predetermined amount by driving a pixel shift mechanism based on an adjustment value stored in a storage unit;

a third step of imaging the image of the subject on said image sensing unit displaced by the predetermined amount to output second image data;

a fourth step of calculating a pixel shift evaluation value for judging whether the pixel shift photography on a completed combined image has been performed correctly or not, based on comparing the first image data output before the displacing of said image sensing unit and the second image data output after the displacing of said image sensing unit;

a fifth step of calculating a new adjustment value by re-calculating the adjustment value, based on the calculated pixel shift evaluation value, and changing the adjustment value stored in said storage unit to the new adjustment value;

a sixth step of repeating said first to fifth steps for a predetermined number of times, or until the new adjustment value becomes within a predetermined range; and a seventh step of performing pixel shift photography with a final adjustment value.

* * * * *